United States Patent
Henkel

(10) Patent No.: US 8,188,913 B2
(45) Date of Patent: May 29, 2012

(54) METHOD FOR A GLOBAL SATELLITE NAVIGATION SYSTEM

(75) Inventor: Patrick Henkel, Emmering (DE)

(73) Assignee: DLR Deutsches Zentrum für Luft- und Raumfahrt e.V. (DE)

( * ) Notice: Subject to any disclaimer, the term of this patent is extended or adjusted under 35 U.S.C. 154(b) by 0 days.

(21) Appl. No.: 12/910,433

(22) Filed: Oct. 22, 2010

(65) Prior Publication Data

US 2011/0122020 A1 May 26, 2011

Related U.S. Application Data

(63) Continuation of application No. PCT/EP2009/054855, filed on Apr. 22, 2009.

(30) Foreign Application Priority Data

Apr. 22, 2008 (EP) .................................. 08007781

(51) Int. Cl.
*G01S 19/03* (2010.01)
(52) U.S. Cl. .................................................. 342/357.4
(58) Field of Classification Search ................ 342/357.4
See application file for complete search history.

(56) References Cited

U.S. PATENT DOCUMENTS

| | | | | |
|---|---|---|---|---|
| 4,812,991 A | * | 3/1989 | Hatch | 701/225 |
| 5,148,179 A | * | 9/1992 | Allison | 342/357.31 |
| 5,359,332 A | * | 10/1994 | Allison et al. | 342/357.42 |
| 6,061,631 A | * | 5/2000 | Zhang | 701/213 |
| 6,163,754 A | * | 12/2000 | Zhang et al. | 701/215 |
| 6,166,683 A | * | 12/2000 | Hwang | 342/357.37 |
| 6,219,376 B1 | * | 4/2001 | Zhodzishsky et al. | 375/148 |
| 6,434,509 B1 | * | 8/2002 | Tsuchiya et al. | 702/158 |
| 7,221,314 B2 | * | 5/2007 | Brabec et al. | 342/357.27 |
| 7,439,908 B1 | * | 10/2008 | Zhodzishsky et al. | 342/357.24 |
| 2008/0204312 A1 | * | 8/2008 | Euler | 342/357.04 |

OTHER PUBLICATIONS

Henkel et al., "Three frequency linear combinations for Galileo", Positioning, Navigation and Communication, 2007 WPNC'07. 4th Workshop on, IEEE, P1, Mar. 1, 2007, pp. 239-245.*
R. Hatch, "A new three frequency, geometry-free technique for ambiguity resolution", Proc. of ION-GNSS, Fort Worth, USA, pp. 309-316, 2006.
Cocard, et al.; "A systematic investigation of optimal carrier-phase combinations for modernized triple-frequency GPS"; Journal of Geodesy vol. 82, No. 9, 555-564, DOI: 10.1007/s00190-007-0201-x; Jan. 8, 2008; p. 555-564.
P. Teunissen, "Adjustment Theory: Partitioned model representations", Series on Mathematical Geodesy and Positioning, Delft University Press, 2000.

(Continued)

*Primary Examiner* — Thomas Tarcza
*Assistant Examiner* — Frank J McGue
(74) *Attorney, Agent, or Firm* — St. Onge Steward Johnston & Reens LLC

(57) ABSTRACT

A method for estimating satellite-satellite single difference biases is described. The method uses an ionosphere-free mixed code-carrier combination of maximum ambiguities discrimination defined at the ration between wavelength and noise standard deviation. The accuracy of the biases estimation is further improved by an additional ionosphere-free mixed code-carrier combination of time-difference measurement that is uncorrelated with the first combination. Finally, an alternative method is based on a combination of carrier signals in a common frequency band which allows estimating the biases individually.

20 Claims, 7 Drawing Sheets

OTHER PUBLICATIONS

Wu, et al.; "An optimal GPS data processing technique for precise positioning"; Geoscience and Remote Sensing, IEEE Transactions; Jan. 1, 1993; p. 146-152.

P. Teunissen, "An optimality property of the integer least-squares estimator", Journal of Geodesy, vol. 73, Nr. 11, pp. 587-593, Springer, Jul. 1999.

J. Betz, "Binary Offset Carrier Modulations for Radionavigation", Navigation, vol. 48, No. 4, pp. 227-246, 2002.

Forssell, et al.; "Carrier Phase Ambiguity Resolution in GNSS-2"; Proceedings of the Institute of Navigation (ION) GPS; Jan. 1, 1997; pp. 1727-1736.

G. Blewitt, "Carrier-phase ambiguity resolution for the Global Positioning System applied to geodetic baselines up to 2000 km", Journal Geophysic Research, vol. 94, pp. 10187-10203, 1989.

"Galileo Open Service Signal-in-Space ICD", available online: http://www.galileoju.com, Mai 2006.

A. Niell, "Global Mapping Functions for the Atmosphere Delay at Radio Wavelengths", Journal of Geophysical Research, vol. 101, pp. 3227-3246, 1996.

Gabor, et al; "GPS Carrier Phase Ambiguity Resolution Using Satellite-Satellite Single Differences"; Proceedings of the Institute of Navigation (ION); Sep. 17, 1999; p. 1569-1578.

D. Laurichesse and F. Mercier, "Integer ambiguity resolution on undifferenced GPS phase measurements and its application to PPP", Proc. of ION-GNSS, Forth Worth, USA, Sep. 2007.

P. Teunissen, "Integer estimation in the presence of biases", Journal of Geodesy, vol. 75, Nr. 11, pp. 399-407, Springer, Mar. 2001.

Zhang, et al.; "Investigation of Combined GPS/GALILEO Cascading Ambiguity Resolution Schemes"; ION GPS/GNSS 2003, Sep. 9-12, 2003; 12 pages.

International Preliminary Report on Patentability and Written Opinion of the International Searching Authority; PCT/EP2009/054855; Oct. 26, 2010; 10 pages.

International Search Report; PCT/EP2009/054855; Dec. 16, 2009; 5 pages.

P. Henkel and C. Günther, "Joint L-/C-Band Code and Carrier Phase Linear Combinations for Galileo", International Journal of Navigation and Observation, Special Issue on Future GNSS Signals, Hindawi Publ., Jan. 2008.

G. Hein, J. Avila-Rodriguez, S. Wallner, A. Pratt, J. Owen, J.-L. Issler. J. Betz, C. Hegarty, S. Lenahan, J. Rushanan, A. Kraay and T. Stansell, "MBOC: The New Optimized Spreading Modulation Recommended for Galileo E1 OS and GPS L1C", Proc. of the IEEE/ION Plans, San Diego, pp. 883-892, Apr. 2006.

Henkel, et al.; "Precise point positioning with multiple Galileo frequencies"; Position, Location and Navigation Symposium, 2008 IEEE/ION; May 5, 2008; p. 592-599.

M. Ge, G. Gendt, M. Rothacher, C. Shi and J. Liu, "Resolution of GPS carrier-phase ambiguities in Precise Point Positioning (PPP) with daily observations", Journal of Geodesy, Springer, Oct. 2007.

Banville, et al.; "Satellite and Receiver Phase Bias Calibration for Undifferenced Ambiguity Resolution"; Proc of the 2008 National Technical Meetings of the ION, Jan. 28, 2008; 9 pages.

M. Gabor and S. Nerem, "Satellite-satellite single difference phase bias calibration as applied to ambiguity resolution", Navigation, vol. 49, Nr. 4, pp. 223-242, 2002.

G. Wübbena, "Software developments for geodetic positioning with GPS using TI-4100 code and carrier measurements", Proc. of 1-st Intern. Symposium on Precise Positioning with the Global Positioning System, Rockville, USA, pp. 403-412, Apr. 1985.

G. Hein, J. Godet, J.-L. Issler, J. Martin, P. Erhard, R. Lucas-Rodriguez and T. Pratt, Status of "Status of Galileo frequency and signal design", Proc. of ION-GPS, Portland, USA, 2002.

Henkel, et al.; "Three frequency linear combinations for Galileo"; Positioning, Navigation and Communication, 2007. WPNC '07. 4th Workshop; Mar. 1, 2007; p. 239-245.

European Office Action; Application No. EP 09 734 936.9—2220; Issued: May 16, 2011; 6 pages.

* cited by examiner

·········· Bootstrapping of integer decorrelated ambiguities
———— Bootstrapping of float ambiguities in original order
·········· Bootstrapping of float amb. sorted with incr. variance
------ Bootstrapping of float amb. sorted with decr. variance

METHOD FOR A GLOBAL SATELLITE NAVIGATION SYSTEM

CROSS-REFERENCE TO RELATED APPLICATIONS

The present application is a continuation application of pending International patent application No. PCT/EP2009/054855 filed on Apr. 22, 2009 which designates the United States and claims priority from European patent application No. 08 007 781.1 filed on Apr. 22, 2008, the disclosure of each of which is hereby incorporated by reference it its entirety as part of the present disclosure.

FIELD OF THE INVENTION

The invention relates to a method for a global satellite navigation system with at least two carriers, from which a linear combination is formed by a reference station for estimating a satellite-satellite single difference phase and code bias, wherein the estimated bias is provided to a mobile receiver, which computes the same linear combination, subtracts the bias from the linear combination and determines integer phase ambiguities.

The invention further relates to a reference station, a mobile navigation device and a software product.

BACKGROUND OF THE INVENTION

Such a method is known from GABOR, M. and NEREM, S., Satellite-satellite single difference phase calibration as applied to ambiguity resolution, Navigation, Vol. 49, Nr. 4, pp. 223-242, 2002 [2]. The known method uses the ionosphere-free Melbourne-Wübbena (=MW) combination [1]. In a reference station a satellite-satellite single difference (=SD) phase and code bias is estimated, wherein the estimated bias is provided to a mobile receiver, which computes the same linear combination, substracts the bias from the linear combination and determines integer phase ambiguities.

The MW combination is widely used for precise point positioning (=PPP) to determine the widelane ambiguities. The MW combination is a geometry-free L1/L2 code-carrier combination that removes the tropospheric delay, the clock offset and further non-dispersive error sources. The MW combination and an additional ionosphere-free L1/L2 phase combination are used in particular in [2], [3] and [4] to determine L1 phase bias estimates.

However, there exist a variety of disadvantages of this known method: First, the L1 and L2 phase biases can not be separated from the L1 and L2 code biases, i.e. the L1 phase bias estimate also includes weighted L1 and L2 code biases. Secondly, the Melbourne-Wübbena combination refers to a geometry-free, ionosphere-free linear combination which eliminates the range and can not be used for positioning. In principle, geometry-preserving, ionosphere-free combinations can be found where the L1 and L2 bias of the known method are applicable, but these combinations are narrow-lane combinations with a wavelength of at most 10.7 cm. This rather low wavelength prevents any reliable ambiguity resolution at the mobile receiver.

SUMMARY OF THE INVENTION

Proceeding from this related art, the present invention seeks to provide improved methods for estimating biases.

This object is achieved by a method having the features of the independent claims. Advantageous embodiments and refinements are specified in claims dependent thereon.

In a first embodiment of the method, the satellite-satellite single difference bias of a single ionosphere-free, geometry-preserving combination of the code and phase signals of at least two carriers is determined by using a maximum combination discrimination requirement or a minimum noise requirement for the linear combination. Using such a combination enables the reference station to estimate biases that are directly applicable for positioning.

An ionosphere-free mixed code-carrier bias, integer phase ambiguities and tropospheric wet zenith delays are advantageously obtained by the reference station using a least-square estimation that minimizes the errors in the estimation process.

The combination discrimination requirement can be defined as the ratio of the wave-length of the combination and the weighted sum formed by the bias of the combination and the standard deviation of the combination. By maximizing such a combination discrimination requirement the combination is chosen such that the combination error and the bias of the combination is as small as possible with respect to the combination wavelength resulting in small relative errors in the determination of the combination biases.

In a simplified method, the combination discrimination requirement is defined as the ratio of the wavelength of the combination and the standard deviation of the mixed code-carrier combination noise. Such a combination discrimination requirement still results in a robust determination of the biases of the linear combination.

For allowing the receiver to judge on the reliability of the bias, the reference station is transmitting the bias together with the standard deviation associated with the bias of the combination to the mobile receiver.

The estimation of the biases can be further improved, if an additional geometry preserving, ionosphere-free combination of time differences of measurements or time differences of geometry-preserving ionosphere-free combinations of measurements are used for determining the biases, wherein the weighting coefficients of the additional combination fulfills the requirement that the ionosphere-free, geometry-preserving combination of the code and phase signals of at least two carriers are uncorrelated.

In an alternative embodiment of the method, the individual biases are determined for the phase signal and the code signal of at least three carriers, wherein at least two carriers belong to a common frequency band and have the same bias. The biases are transmitted to the mobile receiver which uses the biases for determining integer phase ambiguities. Using this alternative embodiment of the method results in separates estimates of the ionospheric delay and the individual biases.

For the Galileo global satellite navigation system the individual biases of the L1 phase signal, the E5 signal, the L1 code signal and the E5 code signal are determined by dividing the Galileo E5 band into at least two sub-bands whose carrier signals have the same frequency and therefore the same bias.

The Galileo E5 band can further be split into the sub-bands E5a and E5b and E5c, wherein the later one corresponds to the central lobe between E5a and E5b allowing an estimation of an individual biases of the four carrier signals.

The estimation of the individual biases is advantageously performed in a subspace of the range domain, by applying orthogonal projections on the measured phase signals that transform the measurements into a subspace to the range domain that extends not to ionospheric and tropospheric errors. Thus, the ionospheric and tropospheric errors do not affect the estimation of the individual biases.

As in the previous embodiment of the method, the reference station is transmitting the biases together with the standard deviation associated with the biases for allowing the mobile receiver to judge on the accuracy of the biases.

It is also possible to perform both embodiments of the method and to use the former embodiment of the method to verify the individual biases resulting from the later embodiment of the method.

If the individual biases resulting from the later method are stated invalid, the biases resulting from the former method can be used instead of the individual biases resulting from the later method.

In both embodiments of the methods, the mobile receiver advantageously determines its integer ambiguities by a sequential bootstrapping and integer decorrelation after removal of the bias estimates. Such an approach has a higher success rate than the direct determination of the integer ambiguities.

BRIEF DESCRIPTION OF THE DRAWINGS

Further advantages and properties of the present invention are disclosed in the following description, in which exemplary embodiments of the present invention are explained in detail based on the drawings.

DETAILED DESCRIPTION OF THE INVENTION

In the following, various embodiments are described in detail:

1. Introduction

Figure 1:
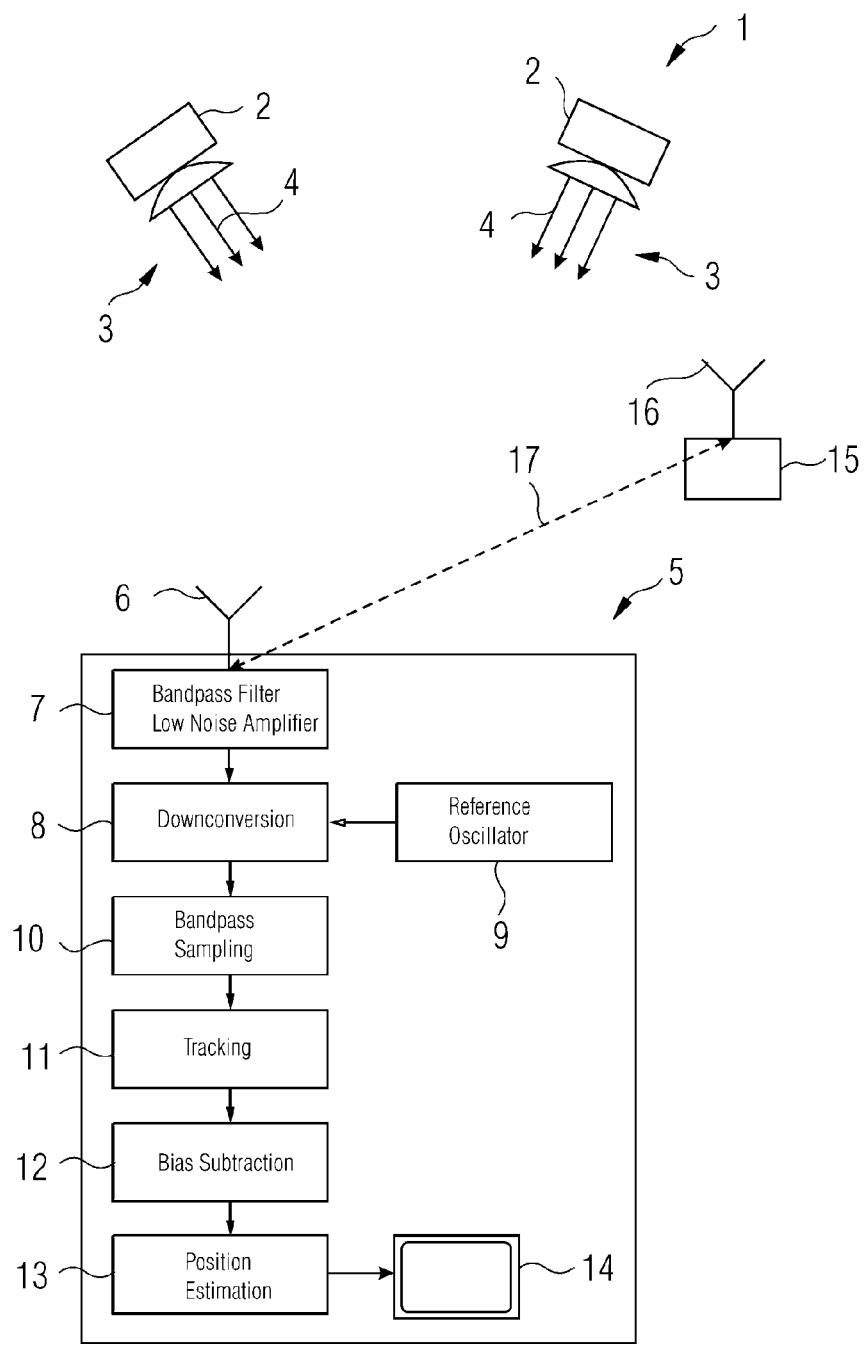
FIG. 1 shows a global satellite navigation system and a receiver for the global satellite navigation system.

FIG. 1 shows a global satellite navigation system 1, which comprises satellites 2 orbiting around the earth and emitting navigation signals 3 modulated on a number of carrier signals 4. The navigation signals 4 are received by a mobile navigation device 5 via an antenna 6. The antenna 6 is connected to a band pass filter and low noise amplifier 7, in which the received navigation signal 3 is sampled and amplified. In a subsequent down converter 8, that is connected to the band pass filter and low noise amplifier 7 and to a reference oscillator 9, the received navigation signal 3 is converted to lower frequencies using the oscillating signal from the reference oscillator 9. The down-converted navigation signal is passing a band pass and sampling unit 10, in which the analog navigation signal 4 is sampled. The sampled navigation signal 3 is then passed to a tracking unit 11, where the navigation signals 3, in particular the phases of the carrier signals 4 and the delay of code signals contained in the navigation signal 4, are tracked. The tracking unit 11 is followed by a bias subtraction unit 12, in which phase and code biases are subtracted from the phases of the carrier signals 4 and from the code signal. A subsequent position estimation unit 13 determines the actual position of the navigation device 5 based on phase signal obtained by processing the carrier signal 4 and based on the codes signals. The results of the position estimation, can finally be displayed on a monitoring device 14. It should be noted that tracking unit 11, the subtraction unit 12 and the position estimation unit 13 are functional units that can be implemented by hardware or by software code executed by a processor.

It should be noted that the position of the navigation device 5 is generally determined with respect to a reference station 15 that receives the satellite signals 3 by an antenna 16. A base line 17 is the distance between the navigation device 5 and the reference station 15. The reference station 15 can also be used to determine various disturbances since the position of the reference station 15 is known. The parameter of the disturbances, such as ionospheric delay, tropospheric delay, code biases and phase biases can be transmitted from the reference station 15 to the mobile navigation device 5 allowing PPP for the mobile navigation device 5, for instance by transmitting the phase bias and code biases from the reference station 15 to the mobile navigation device 5 so that the phase biases can be subtracted from the phases of the carrier signals and the code biases can be subtracted from the code signal.

It should be noted that the biases transmitted from the reference station 15 are subtracted from the same linear combination of the phase signals and code signals that have been used in the reference station 15 for determining the biases of the phase signals and code signals.

In the following, two new approaches are proposed for PPP with Galileo: The first one is based on an ionosphere-free mixed code-carrier combination with a wavelength of 3.215 m and a noise level of 3.76 cm [5]. It is a geometry-preserving linear combination so that the bias estimates from the reference station 15 are directly applicable for positioning performed in the mobile navigation device 5. The large wavelength significantly increases the reliability of ambiguity resolution while estimating the position of the navigation device 5. Advantageously, a sequential bootstrapping with an integer decorrelation transformation [6] can be used for estimating the position of the mobile navigation device 5.

Figure 2:
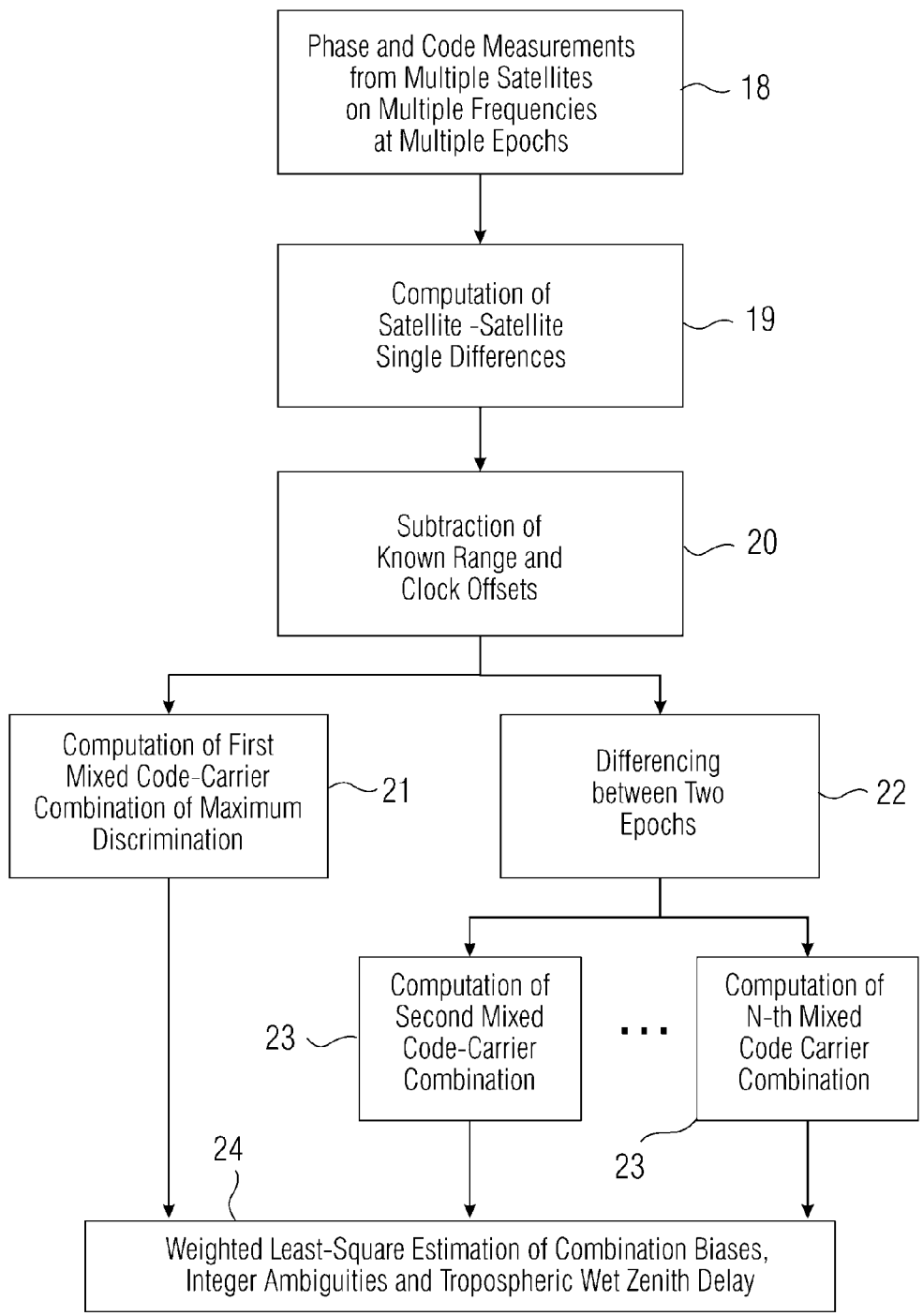
FIG. 2 shows a flow chart of a method using an ionosphere-free code-carrier linear combination and an additional, uncorrelated code-carrier combination of time-differenced measurements for a bias estimation at a single reference station.

FIG. 2 shows a flow chart of the method as performed in the reference station 15. As in the mobile navigation device 5, the navigation signal 4 is processed by a band pass filter and low noise amplifier, a down converter connected to a reference oscillator, a band pass and sampling unit and a tracking unit. These functional units can be implemented by hardware or by software code executed by a processor. These functional units are used to perform a phase and code measurement 18 from multiple satellites 2, on multiples frequencies at multiple epochs. Since the position of the reference station 15 is known, the position estimation unit 13 is replaced by an bias estimation unit that performs a computation 19 of satellite-satellite single differences of the measurements and further performs a subtraction 20 of the known range and clock offsets. The subtraction 20 is followed on the one hand by a computation 21 of a first mixed code-carrier combination of maximum discrimination or minimal noise and on the other hand by differencing 22 measurements between two epochs and a computation 23 of at least one further mixed code-carrier combination. The first mixed code-carrier combination resulting from the computation 21 and the at least one further combination based on time differenced measurement of different epochs are finally used for a weighted least-square estimation 24 of the combination biases, integer ambiguities and tropospheric wet zenith delay.

The second method uses phase and code measurements on four frequencies without linear combinations. The estimation of independent phase and code biases on each frequency is not feasible as at least one phase bias can not be separated from the ionospheric delay. However, the Galileo E5 band can be split into the E5a, E5b and E5c signal with the latter one corresponding to the central lobe between E5a and E5b. These three signals are modulated onto a single carrier which motivates the assumption of a common bias. In this case, the L1 and E5 code and phase biases can be determined separately.

2. Design of Ionosphere-Free Mixed Code-Carrier Combinations

In the following the design of ionosphere-free mixed code carrier combinations is described.

The received code signal $\rho_{u,m}^k(t_i)$ and carrier phase signal $\phi_{u,m}^k(t_i)$ at receiver u from satellite k on frequency m at epoch i is modeled as $$\rho_{u,m}^k(t_i) = r_u^k(t_i) + \delta r_u^k(t_i) + c(\delta\tau_u(t_i) - \delta\tau^k) + \qquad (1)$$
$$q_{1m}^2 I_u^k(t_i) + T_u^k(t_i) + b_{\rho_{u,m}} + b_{\rho_m}^k + \varepsilon_{\rho_{u,m}}^k(t_i)$$

$$\lambda_m \phi_{u,m}^k(t_i) = r_u^k(t_i) + \delta r_u^k(t_i) + c(\delta\tau_u(t_i) - \delta\tau^k) - \qquad (2)$$
$$q_{1m}^2 I_u^k(t_i) + T_u^k(t_i) + \lambda_m N_{u,m}^k + \lambda_m b_{\phi_{u,m}} + \lambda_m b_{\phi_m}^k + \varepsilon_{\phi_{u,m}}^k(t_i)$$

with the receiver-satellite range $r_u^k(t_i)$, the projected orbital error $\delta r_u^k(t_i)$, the receiver/satellite clock errors $\{c\delta\tau_u, c\delta\tau^k\}$, the ionospheric delay $I_u^k$ on L1, the ratio of frequencies $q_{ij}=f_i/f_j$, the tropospheric delay $T_u^k$, the integer ambiguity $N_{u,m}^k$, the receiver code/phase bias $b_{\rho_{u,m}}$, $b_{\phi_{u,m}}$, the satellite code/phase bias $b_{\rho_m}^k$, $b_{\phi_m}^k$ and code/carrier phase noise $\varepsilon_{\rho_{u,m}}^k(t_i)$, $\varepsilon_{\phi_{u,m}}^k(t_i)$ including multipath.

The phase weights $\alpha_m$ and code weights $\beta_m$ of a geometry-preserving (=GP) code-carrier linear combination $$\sum_{m=1}^{M} \alpha_m \lambda_m \varphi_m + \sum_{m=1}^{M} \beta_m \rho_m$$

of the received code and phase signals at M frequencies are constraint by $$\sum_{m=1}^{M} \alpha_m + \sum_{m=1}^{M} \beta_m = 1. \qquad (3)$$

The ionospheric delay of first order is eliminated if $$\sum_{m=1}^{M} \alpha_m q_{1m}^2 - \sum_{m=1}^{M} \beta_m q_{1m}^2 = 0. \qquad (4)$$

Thus, a linear combination of the received code and phase signals is called ionosphere-free (=IF) if the condition of Equation (4) is fulfilled.

The linear combination is periodic with wavelength λ if the phase weights can be written as $$\alpha_m = \frac{j_m \lambda}{\lambda_m} \qquad (5)$$

where $j_m$ denotes an integer. Correspondingly, a combination of phase signals is called integer nature preserving (=NP) if the condition according to Equation (5) is met.

The variance of the linear code-carrier combination is given by $$\sigma_n^2 = \sum_{m=1}^{M} \alpha_m^2 \sigma_{\phi_m}^2 + \beta_m^2 \sigma_{\rho_m}^2 \qquad (6)$$

and the combination discrimination is defined as $D=\lambda/\sigma_n$. For a three frequency mixed code-carrier combination with given integer coefficients $j_m$, there exist four degrees of freedom (three for $\beta_m$ and one for λ) of which two are required to fulfill (3) and (4). The remaining two might be used to minimize the noise variance or to maximize the combination discrimination.

In the first case, the additional constraints are given by $$\frac{\partial \sigma_n^2(\lambda, \beta_1)}{\partial \lambda} \stackrel{!}{=} 0 \text{ and } \frac{\partial \sigma_n^2(\lambda, \beta_1)}{\partial \beta_1} \stackrel{!}{=} 0 \qquad (7)$$

$$\frac{\partial^2 \sigma_n^2(\lambda, \beta_1)}{\partial \lambda^2} \cdot \frac{\partial^2 \sigma_n^2(\lambda, \beta_1)}{\partial \beta_1^2} - \left(\frac{\partial}{\partial \lambda}\frac{\partial}{\partial \beta_1}\sigma_n^2(\lambda, \beta_1)\right)^2 \stackrel{!}{>} 0.$$

The standard deviations $\sigma_{\rho_m}$ are obtained from the Cramer Rao bound given by $$\Gamma_m = \frac{c^2}{\frac{C}{N_0} \cdot \frac{\int (2\pi f)^2 |S_m(f)|^2 df}{\int |S_m(f)|^2 df}}, \qquad (8)$$

with the speed of light c, the carrier to noise power ratio $$\frac{C}{N_0},$$

and the power spectral density $S_m(f)$ that has been derived by Betz in [15] for binary offset carrier (=BOC) modulated signals. Table 1 shows the Cramer Rao bounds of the wideband Galileo signals.

In the second case, the wavelength and code weights of the combination with maximum ambiguity discrimination D are given by the non-linear optimization $$\max_{\substack{\alpha_1,\ldots,\alpha_M \\ \beta_1,\ldots,\beta_M}} D = \frac{\lambda(\alpha_1,\ldots,\alpha_M,\beta_1,\ldots,\beta_M)}{2\sigma_{n_1}(\alpha_1,\ldots,\alpha_M,\beta_1,\ldots,\beta_M)}. \quad (9)$$

The code weight $\beta_2$ is obtained from (3) as $$\beta_2 = 1 - \sum_{m=1}^{M} \alpha_m - \beta_1 - \sum_{m=3}^{M} \beta_m, \quad (10)$$

and the code weight $\beta_1$ is computed with the ionosphere-free constraint of (4), i.e.

$$\beta_1 = \sum_{m=1}^{M} \alpha_m q_{1m}^2 - \sum_{m=2}^{M} \beta_m q_{1m}^2 \quad (11)$$

$$= \sum_{m=1}^{M} \alpha_m q_{1m}^2 - \left(1 - \sum_{m=1}^{M} \alpha_m - \beta_1 - \sum_{m=3}^{M} \beta_m\right) q_{12}^2 - \sum_{m=3}^{M} \beta_m q_{1m}^2.$$

Replacing $\alpha_m$ by (5), using $$\lambda = \tilde{\lambda}_0 \cdot w_\varphi \text{ with } \tilde{\lambda}_0 = \frac{1}{\sum_{m=1}^{M} \frac{j_m}{\lambda_m}} \text{ and } \tilde{\lambda}_0 = \frac{1}{\sum_{m=1}^{M} \frac{j_m}{\lambda_m}} \quad (12)$$

and solving for $\beta_1$ yields $$\beta_1 = s_1 + s_2 w_\phi + \sum_{m=3}^{M} s_m \beta_m \quad (13)$$

with $$s_1 = -\frac{q_{12}^2}{1 - q_{12}^2} \quad (14)$$

$$s_2 = \frac{\tilde{\lambda}}{1 - q_{12}^2} \cdot \sum_{m=1}^{M} \frac{j_m}{\lambda_m} \cdot (q_{12}^2 + q_{1m}^2) \quad (15)$$

$$s_m = \frac{q_{12}^2 - q_{1m}^2}{1 - q_{12}^2} \ \forall \ m \in \{3,\ldots,M\} \quad (16)$$

Equation (13) is used to rewrite (10) as $$\beta_2 = 1 - s_1 + (-1 - s_2)w_\phi - \sum_{m=3}^{M}(1 + s_m)\beta_m, \quad (17)$$

which allows us to express D as a function of $w_\phi$ and $\beta_m$, $m \geq 3$:

$$D = \frac{\tilde{\lambda}}{2} \cdot w_\phi \cdot \left(\tilde{\eta}^2 w_\phi^2 + \left(s_1 + s_2 w_\phi + \sum_{m=3}^{M} s_m \beta_m\right)^2 \sigma_{\rho_1}^2 + \right. \quad (18)$$

$$\left. \left(1 - s_1 + (-1 - s_2)w_\phi - \sum_{m=3}^{M}(1 + s_m)\beta_m\right)^2 \sigma_{\rho_2}^2 + \sum_{m=3}^{M} \beta_m^2 \sigma_{\rho_m}^2\right)^{-1/2}$$

with $\tilde{\eta}^2 = \tilde{\lambda}^2 \cdot \sum_{m=1}^{M} \frac{j_m^2}{\lambda_m^2} \sigma_{\phi_m}^2$.

The maximum discrimination is given by $$\frac{\partial D}{\partial w_\phi} = 0 \quad (19)$$

and $$\frac{\partial D}{\partial \beta_m} = 0 \ \forall \ m \in \{3,\ldots,M\}. \quad (20)$$

Equation (20) is equivalent to $$s_m \sigma_{\rho_1}^2 \left(s_1 + s_2 w_\varphi + \sum_{l=3}^{M} s_l \beta_l\right) - \quad (21)$$

$$(1 + s_m)\sigma_{\rho_2}^2 \left(1 - s_1 - (1 + s_2)w_\varphi - \sum_{l=3}^{M}(1 + s_l)\beta_l\right) + \beta_m \sigma_{\rho_m}^2 = 0,$$

which can be written also in matrix-vector notation as $$A \cdot [\beta_3,\ldots,\beta_M]^T + b \cdot w_\phi + c = 0, \quad (22)$$

with $$A_{m,l} = s_l s_m \sigma_{\rho_1}^2 + (1+s_l)(1+s_m)\sigma_{\rho_2}^2 + \sigma_{\rho_m}^2 \delta(m-l)$$

$$b_m = s_2 s_m \sigma_{\rho_1}^2 + (1+s_m)(1+s_2)\sigma_{\rho_2}^2$$

$$c_m = s_1 s_m \sigma_{\rho_1}^2 - (1+s_m)(1-s_1)\sigma_{\rho_2}^2, \quad (23)$$

and $\delta(m-l)$ being 1 for m=l and 0 otherwise. Solving (22) for $\rho_m$ yields $$[\beta_3,\ldots,\beta_M]^T = -A^{-1}(c + b \cdot w_\phi). \quad (24)$$

Constraint (19) is written in full terms as $$\left(s_1 + s_2 w_\phi + \sum_{m=3}^{M} s_m \beta_m\right)\left(s_1 + \sum_{m=3}^{M} s_m \beta_m\right)\sigma_{\rho_1}^2 + \quad (25)$$

$$\left(1 - s_1 - (1+s_2)w_\phi - \sum_{m=3}^{M}(1+s_m)\beta_m\right) \cdot \left(1 - s_1 - \sum_{m=3}^{M}(1+s_m)\beta_m\right)$$

$$\sigma_{\rho_2}^2 + \sum_{m=3}^{M} \beta_m^2 \sigma_{\rho_m}^2 = 0.$$

Replacing $[\beta_3, \ldots, \beta_M]^T$ by (24) yields $$(s_1+s_2 w_\phi-t^T A^{-1}(c+bw_\phi))\cdot(s_1-t^T A^{-1}(c+bw_\phi))\cdot\sigma_{\rho_1}^2$$

$$+(1-s_1-(1+s_2)w_\phi+u^T A^{-1}(c+bw_\phi))\cdot(1-s_1+u^T A^{-1}(c+bw_\phi))\cdot\sigma_{\rho_2}^2$$

$$+(c+bw_\phi)^T A^{-T}\Sigma A^{-1}(c+bw_\phi)=0, \quad (26)$$

with $t=[s_3, \ldots, s_M]^T$, $u=s+1$, and the diagonal matrix $\Sigma$ that is given by $$\Sigma = \begin{bmatrix} \sigma_{\rho_3}^2 & 0 & 0 \\ 0 & \ddots & 0 \\ 0 & 0 & \sigma_{\rho_M}^2 \end{bmatrix}. \quad (27)$$

Equation (26) can be simplified to $$r_1 + r_2 \cdot w_\phi = 0, \quad (28)$$

with $$r_1 = (s_1-t^T A^{-1}c)^2 \sigma_{\rho_1}^2 + (1-s_1+u^T A^{-1}c)^2 \sigma_{\rho_2}^2 + c^T A^{-T}\Sigma A^{-1}c, \quad (29)$$

and $$r_2 = ((s_1-t^T A^{-1}c)(-t^T A^{-1}b)+(s_2-t^T A^{-1}b)(s_1-t^T A^{-1}c))\cdot\sigma_{\rho_1}^2$$
$$+((1-s_1+u^T A^{-1}c)u^T A^{-1}b-(1+s_2-u^T A^{-1}b)(1-s_1+u^T A^{-1}c))\cdot\sigma_{\rho_2}^2$$
$$+(c^T A^{-T}\Sigma A^{-1}b+b^T A^{-T}\Sigma A^{-1}c). \quad (30)$$

The optimum phase weighting $w_{\phi_{opt}} = -r_1/r_2$ is used in (24), (17) and (13) to obtain the code weights. Equation (12) provides the optimum wavelength for the computation of the phase weights with (5). Table 2 shows the weighting coefficients and properties of GP-IF-NP linear combinations of maximum ambiguity discrimination based on code and carrier phase measurements on up to five frequencies. The dual frequency E1-E5a combination is characterized by a noise level of 31.4 cm and a wavelength of 4.309 m which allows reliable ambiguity resolution within a few epochs. As only the E1 and E5a frequencies lie in aeronautical bands, this linear combination might be useful for aviation.

Linear combinations that comprise the wideband E5 and E6 code measurements benefit from a substantially lower noise level which turns into a larger ambiguity discrimination. It increases to 25.1 for the E1-E5 combination, to 39.2 for the E1-E5-E6 combination, and to 41.2 for the E1-E5a-E5b-E5-E6 combination. The large wavelength of these combinations makes them robust to the non-dispersive orbital errors and satellite clock offsets. The linear combination of measurements on 5 frequencies has the additional advantageous property of $|\beta_m|<1$ and $|j_m|<2$ for all m.

Table 3 shows the weighting coefficients and properties of the optimum widelane and narrowlane linear combinations for an increased noise level. The larger noise assumptions result in lower code weights and a slightly larger E6 phase weight for the four-frequency E1-E5a-E5b-E6 widelane combination. For all other frequency settings, the weighting coefficients are the same as in Table 2. For narrowlane combinations, the use of additional frequencies has only a negligible impact on $\lambda$ and $\sigma_n$. The ambiguity discrimination varies between 10.1 and 11.2 which is larger than in the case of the first three combinations of Table 3 but smaller than in the case of the remaining widelane combinations.

The previous maximization of $$\frac{\lambda}{2\sigma_n}$$

does not take the biases into account. The worst case combination bias is obtained from the upper bounds $b_{\phi_m}$ and $b_{\rho_m}$ on the measurement biases as $$b_n = \sum_{m=1}^{M} |\alpha_m| \cdot b_{\phi_m} + |\beta_m| \cdot b_{\rho_m}. \quad (31)$$

Table 4 shows triple frequency mixed code-carrier widelane combinations of maximum ambiguity discrimination $$D = \frac{\lambda}{2\sigma_n}$$

with an additional constraint on the combination bias. Obviously, the bias constraint results in significantly lower weighting coefficients.

A more generalized ambiguity discrimination is suggested which is defined as the ratio between the wavelength $\lambda$ and a weighted sum of the combination standard deviation $\sigma_n$ and the combination bias $b_n$, i.e.

$$D = \frac{\lambda}{\kappa_1 \sigma_n + \kappa_2 b_n}, \quad (32)$$

with the weighting coefficients $\kappa_1$ and $\kappa_2$. Table 5 shows the weighting coefficients and properties of GP-IF-NP mixed code-carrier combinations that maximize the discrimination of Equation (32) for $\kappa_1=1$ and $\kappa_2=1$. As the maximization of Equation (32) tends to large wavelength, a wavelength constraint has been introduced to limit the noise amplification.

Advantageously, a combination that maximizes Equation (32) is used for precise point positioning and bias estimation as it benefits from a large robustness over both biases and statistical errors.

3. PPP with Satellite-Satellite SD Measurements and Mixed Code-Carrier Combinations Precise point positioning requires precise phase bias estimation to maintain the integer nature of ambiguities. Satellite-satellite single difference measurements (=SD) are evaluated in [2] to eliminate the receiver bias and clock offset. The satellite-satellite SD phase biases are computed at a network of reference stations [3] and provided to the users.

The received SD code and carrier phase are obtained from (1) as $$\rho_{u,m}^{kl}(t_i) = r_u^{kl}(t_i) + q_{lm}^2 I_u^{kl}(t_i) + T_u^{kl}(t_i) + b_{\rho_m}^{kl} + \epsilon_{\rho_{u,m}}^{kl}(t_i) \quad (33)$$

$$\lambda_m \Phi_{u,m}^{kl}(t_i) = r_u^{kl}(t_i) - q_{lm}^2 I_u^{kl}(t_i) + T_u^{kl}(t_i) + \lambda_m N_{u,m}^{kl} + \lambda_m b_{\phi_m}^{kl} + \epsilon_{\phi_{u,m}}^{kl}(t_i) \quad (34)$$

where the SD clock biases and the projected SD orbital errors have been mapped to the SD code/phase biases.

A linear combination of these SD biases is computed at a single reference station and is applicable for users up to a distance of several 100 km away. These biases are updated every 10 min and do not require an extensive averaging over a large network of reference stations.

3.1 Bias Estimation with Melbourne-Wübbena Combination

The L1/L2 phase bias calibration of [2],[3] and [4] uses two linear combinations:

In a first step, the ionosphere-free geometry-free Melbourne-Wübbena (MW) combination [1] is computed:

$$\lambda_{WL}\phi_{MW}^{kl} = \left(\frac{f_1}{f_1-f_2}\lambda_1\phi_1^{kl} - \frac{f_2}{f_1-f_2}\lambda_2\phi_2^{kl}\right) - \quad (35)$$

$$\left(\frac{f_1}{f_1+f_2}\rho_1^{kl} + \frac{f_2}{f_1+f_2}\rho_2^{kl}\right)$$

$$= \lambda_{WL}(N_1^{kl} - N_2^{kl}) + \lambda_{WL}(b_{\phi_1}^{kl} - b_{\phi_2}^{kl}) -$$

$$\frac{f_1}{f_1+f_2}b_{\rho_1}^{kl} - \frac{f_2}{f_1+f_2}b_{\rho_2}^{kl} + \varepsilon_{MW}^{kl}$$

where the receiver and time indices have been omitted and $\lambda_{WL}$ denotes the wavelength of the widelane combination.

In a second step, the L1/L2 ionosphere-free (IF) carrier phase combination is determined, i.e.

$$\lambda_{IF}\phi_{IF}^{kl} = \frac{f_1^2}{f_1^2-f_2^2}\lambda_1\phi_1^{kl} - \frac{f_2^2}{f_1^2-f_2^2}\lambda_2\phi_2^{kl} \quad (36)$$

$$= r^{kl} + T^{kl} + \frac{f_1^2}{f_1^2+f_2^2}\lambda_1(N_1^{kl} + b_{\phi_1}^{kl}) -$$

$$\frac{f_2^2}{f_1^2-f_2^2}\lambda_2(N_2^{kl} + b_{\phi_2}^{kl}) + \varepsilon_{IF}^{kl}$$

which includes the joint ambiguity/bias term $B_{IF}^{kl}$ that is defined as $$B_{IF}^{kl} = \frac{f_1^2}{f_1^2-f_2^2}\lambda_1(N_1^{kl}+b_{\phi_1}^{kl}) - \frac{f_2^2}{f_1^2-f_2^2}\lambda_2(N_2^{kl}+b_{\phi_2}^{kl}) + \varepsilon_{IF}^{kl}. \quad (37)$$

Finally, the MW and IF ambiguity/bias terms are combined by $$\frac{f_1+f_2}{c}B_{IF}^{kl} - \frac{f_2}{f_1-f_2}\phi_{MW}^{kl} = N_1^{kl} + \tilde{b}_{\phi_1}^{kl} + \tilde{\varepsilon}^{kl} \quad (38)$$

with $$\tilde{b}_{\phi_1}^{kl} = b_{\phi_1}^{kl} + \frac{f_2}{f_1+f_2}\frac{b_{\rho_1}^{kl}}{\lambda_1} + \frac{f_2}{f_1+f_2}\frac{b_{\rho_2}^{kl}}{\lambda_2}. \quad (39)$$

The bias estimate on L2 is obtained in a similar way by combining this bias and the MW bias, i.e.

$$\tilde{b}_{\phi_2}^{kl} = b_{\phi_2}^{kl} + \frac{f_1}{f_1+f_2}\frac{b_{\rho_1}^{kl}}{\lambda_1} + \frac{f_1}{f_1+f_2}\frac{b_{\rho_2}^{kl}}{\lambda_2}. \quad (40)$$

These biases are provided by the reference station 15 and enable the mobile navigation device 5 to determine unbiased L1 and L2 integer ambiguities.

However, there exist some critical aspects of this approach: First, the L1 and L2 phase biases can not be determined separately as (39) and (40) also include L1 and L2 code biases. Secondly, the geometry-preserving, ionosphere-free linear combination to which the bias estimates correspond is a narrowlane combination with a wavelength of only 10.7 cm. Any linear combination of the bias estimates in (39) and (40) does not refer to a geometry-preserving, ionosphere-free linear combination with a larger wavelength than 10.7 cm. Another critical point is the significant code noise in the narrowlane combination. All these aspects are the foundation for the design of new ionosphere-free mixed code-carrier combinations for bias estimation.

3.2 Bias Estimation with Mixed Code-Carrier Combinations

The following scheme is suggested for bias estimation:

In a first step, satellite-satellite single difference measurements of code and phase signals are computed where the satellite 2 of highest elevation is typically chosen as a reference satellite.

In a second step, a geometry-preserving, ionosphere-free combination with maximum combination discrimination is then computed from the single difference measurements.

Alternatively, the geometry-preserving, ionosphere-free combination is computed in the first step and single differences are performed in a second step.

For the linear combination, a linear combination of Table 5 is advantageously be used due to its robustness with respect to both stochastical errors and biases. The bias robustness has been introduced as there exist biases like multipath that depend on the location of the mobile navigation device and can not be estimated at the reference station 15. If the maximum bias shall be bounded to a predefined value, a linear combination of Table 4 is advantageously used. If residual biases due to multipath are negligible, a linear combination of either Table 2 or 3 can be chosen. In the following simulations, the first combination of Table 2 has been chosen.

The single differences of this mixed code-carrier combination are written in matrix-vector notation as $$\lambda\Delta\varphi = [\lambda\Delta\varphi^T(t_1)\ldots\lambda\Delta\varphi^T(t_{N_T})]^T \text{ with } \lambda\Delta\varphi(t_i) = [\lambda\varphi^{1K}(t_i)\ldots\lambda\varphi^{(K-1)K}(t_i)]^T. \quad (41)$$

where $N_T$ denotes the number of measurement times and K designates the reference satellite 2.

In a third step, the single difference ranges and the single difference satellite clock offsets are computed from the known ephemeris and the known position of the reference station 15. The sum of the single difference ranges and the single difference satellite clock offsets is denoted as $\Delta r$ and subtracted from the single difference measurements. The obtained linear combinations are modeled as $$\lambda\Delta\tilde{\varphi} = \lambda\Delta\varphi - \Delta r = H_1(\Delta N + \Delta b) + H_2 T_z + \Delta\varepsilon \quad (42)$$

with $$H_1 = \lambda \cdot 1^{N_T \times 1} \otimes I^{(K-1)\times(K-1)} \quad (43)$$

$$H_2 = [\Delta m_w^T(t_1)\ldots\Delta m_w^T(t_{N_T})]^T$$

and $$\Delta m_w(t_i) = \begin{bmatrix} m_w^1(t_i) - m_w^K(t_i) \\ \vdots \\ m_w^{K-1}(t_i) - m_w^K(t_i) \end{bmatrix} \quad (44)$$

where $m_w$ denotes a mapping function for the tropospheric wet zenith delay. Typically, the Niell mapping function of [10] is chosen due to its independence from meteorological data. Then, a weighted least-square estimation of SD combination biases $\Delta b$ and of the tropospheric wet zenith delay $T_z$ is performed. As the integer valued ambiguities and real-valued biases can not be estimated individually, a common ambiguity/bias term $\Delta N+\Delta b$ is estimated and then split into an integer part $\Delta N$ and a fractional part $\Delta b$. The fractional part $\Delta b$ is then broadcasted as a correction term. Any mobile navigation device 5 can then use this bias for precise point positioning with the linear combinations.

In the following simulations, 1 Hz measurements are considered over 10 minutes. The covariance matrix of SDs with a common reference satellite 2 is characterized by $2\sigma_n^2$ for the diagonal elements and by $\sigma_n^2$ for the off-diagonal elements.

Figure 3:
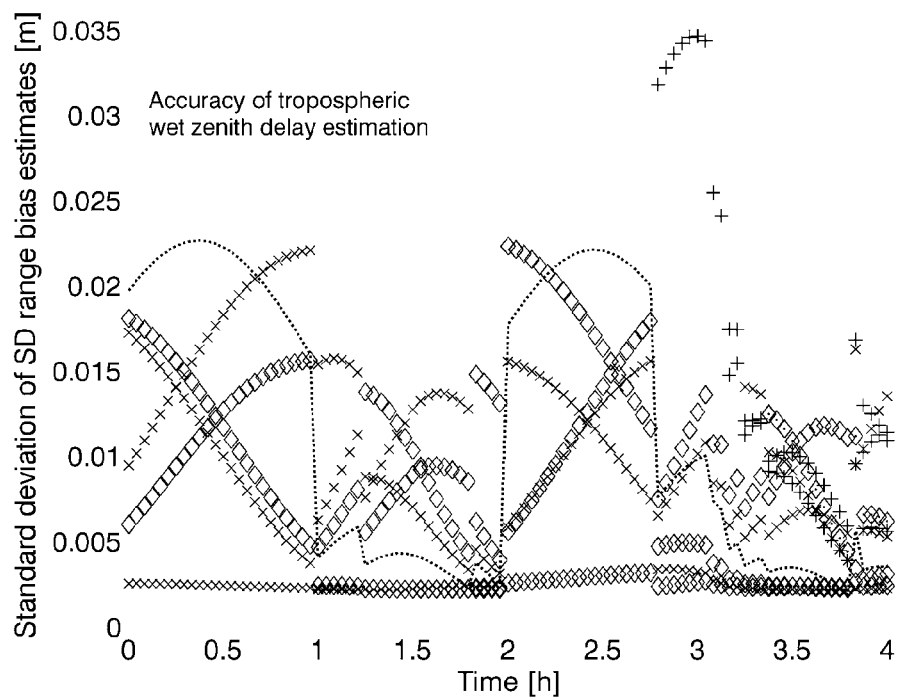
FIG. 3 shows an estimation of satellite-satellite SD biases of the ionosphere-free code-carrier linear combination ($\lambda$=3.215m) at a single reference station.

FIG. 3 shows that a standard deviation between a few millimeters and 2.5 cm is achievable for the SD bias estimates of the ionosphere-free mixed code-carrier combination with $\lambda=3.215$ m.

The accuracy of bias estimation can be significantly improved by using an additional L1-E5 ionosphere-free code-carrier combination. Time-differenced satellite-satellite single difference measurements are used for this combination to avoid the introduction of additional biases and ambiguities. The weighting coefficients are uniquely described by four constraints: Preservation of geometry, elimination of ionosphere, uncorrelated to first combination (of maximum discrimination) and minimum noise amplification. The L1/E5 phase weights are obtained as $\tilde{\alpha}_1=1.7321$, $\tilde{\alpha}_2=-0.8617$ and the respective code coefficients are $\tilde{\beta}_2=0.0002$, $\tilde{\beta}_2=0.1294$. The noise level of this linear combination is characterized by a standard deviation of only 2.3 mm. Both linear combinations are written in matrix-vector notation as $$\begin{bmatrix} \lambda\Delta\tilde{\varphi}_1 \\ \lambda\Delta\tilde{\varphi}_2 \end{bmatrix} = \begin{bmatrix} \lambda\Delta\varphi_1 - \Delta r \\ \lambda\Delta\varphi_2 - \Delta r \end{bmatrix} = \begin{bmatrix} H_1 & H_2 \\ 0 & H_3 \end{bmatrix} \cdot \begin{bmatrix} \Delta N + \Delta b \\ T_z \end{bmatrix} + \begin{bmatrix} \Delta\varepsilon_1 \\ \Delta\varepsilon_2 \end{bmatrix} \quad (45)$$

with $$H_3 = [\Delta m_w^T(t_2) - \Delta m_w^T(t_1), \ldots, \Delta m_w^T(t_{N_T}) - \Delta m_w^T(t_{N_T} - t_{N_T-1})]^T. \quad (46)$$

Figure 4:
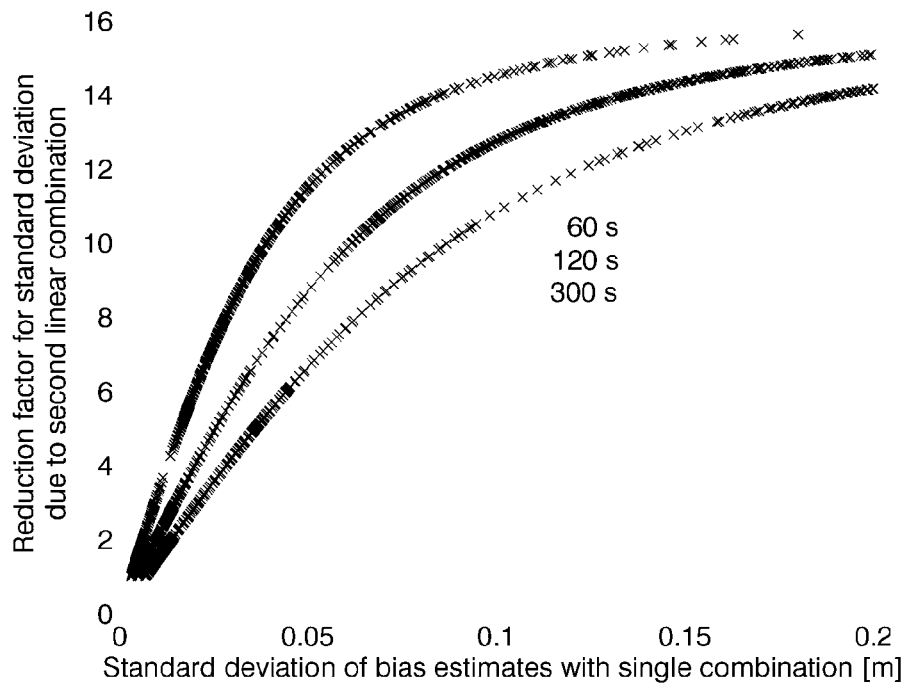
FIG. 4 demonstrates the benefit of an additional, uncorrelated L1-E5 ionosphere-free code-carrier combination of time-differenced measurements for bias estimation at a single reference station.

FIG. 4 demonstrates the benefit of this second combination of time-differenced measurements for bias estimation. The uncertainty of critical SD bias estimates from the first code-carrier combination can be reduced by at least one order of magnitude. Each point refers to one SD for one epoch and the different colors represent different batch intervals.

Figure 5:
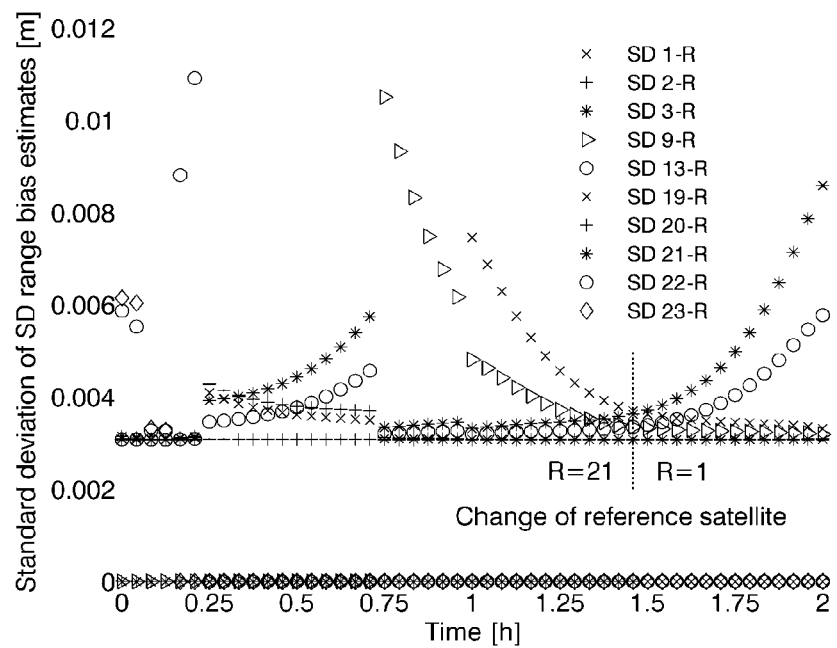
FIG. 5 shows a SD bias estimation of the ionosphere-free code-carrier combination of maximum discrimination ($\lambda$=3.215m): Reduced batch interval to 5 min with aiding by a time-differenced, ionosphere-free code-carrier combination of minimum noise.

The benefit of the second linear combination of time-differenced measurements motivates the reduction of the measurement batch interval to 5 min. FIG. 5 demonstrates an achievable SD bias accuracy between 3 mm and 11 mm whereas the higher values refer to low elevation satellites. The respective SD biases can be estimated more accurately by another reference station with better visibility.

3.3 PPP with Mixed Code-Carrier Combinations

PPP is performed with mixed code-carrier phase combinations using the bias estimates from the reference station 15. The SD mixed code-carrier phase measurements are modeled at the mobile navigation device 5 similar to (45) as $$\lambda\Delta\tilde{\varphi}=\lambda\Delta\varphi-H_1\Delta b=H_0 x+H_1\Delta N+H_2 T_z+\epsilon \quad (47)$$

with the geometry matrix $H_0=[e^{1K} \ldots e^{(K-1)K}]^T$, the user position x and the SD direction vectors $e^{kK}=e^k-e^K$.

The least-square estimation of x, $\Delta N$ and $T_z$ is supported by a second L1-E5 code-only combination of minimum noise amplification. This geometry-preserving, ionosphere-free combination ($\beta_1=2.338$, $\beta_2=-1.338$) has a noise level of $\sigma_n=46.8$ cm and is uncorrelated with the mixed code-carrier combination ($\lambda=3.215$ m). In the further analysis, the single difference operator $\Delta$ is omitted to simplify notation.

The integer ambiguity resolution is based on sequential bootstrapping [11] which achieves a higher success rate than direct rounding. The traditional bootstrapping fixes the ambiguities in the following order: First, the integer ambiguity of the lowest variance is fixed. Then, this ambiguity is removed from the measurements, a new real-valued "float solution" of the position of the mobile navigation device 5, ambiguities and tropospheric zenith delay are computed, and the most reliable float ambiguity is fixed. This step is repeated until all ambiguities are fixed. The sequential fixing takes the correlation between float ambiguity estimates into account and achieves a lower probability of wrong fixing than traditional rounding. Teunissen has expressed the integer ambiguity estimates in [6] as a function of the conditional variances, i.e.

$$\check{N}_{B,1} = [\hat{N}_1] \quad (48)$$

$$\check{N}_{B,2} = [\hat{N}_{2|1}] = \left[\hat{N}_2 - \sigma_{\hat{N}_2 \hat{N}_1}\sigma_{\hat{N}_1}^{-2}(\hat{N}_1 - \check{N}_{B,1})\right]$$

and $$\check{N}_{B,k} = [\hat{N}_{k|k}] = \left[\hat{N}_k - \sum_{l=1}^{k-1}\sigma_{\hat{N}_k \hat{N}_{l|1}}\sigma_{\hat{N}_{l|1}}^{-2}(\hat{N}_{l|1} - \check{N}_{B,l})\right] \quad (49)$$

with [•] denoting the rounding to the nearest integer and $k=\{1,\ldots,k-1\}$. The sequential ambiguity estimator can also be written in matrix-vector notation as $$\begin{bmatrix} \hat{N}_1 - \check{N}_{B,1} \\ \hat{N}_2 - \check{N}_{B,2} \\ \hat{N}_3 - \check{N}_{B,3} \\ \vdots \end{bmatrix} = L \cdot \begin{bmatrix} \hat{N}_1 - \check{N}_{B,1} \\ \hat{N}_{2|1} - \check{N}_{B,2} \\ \hat{N}_{3|1,2} - \check{N}_{B,3} \\ \vdots \end{bmatrix} \quad (50)$$

with $L(i,j)=\sigma_{\hat{N}_i \hat{N}_{j|j}}\sigma_{\hat{N}_{j|j}}^{-2}$ for $i>j$, $L(i,j)=0$ for $i<j$ and $L(i,i)=1$. The conditional variances of $\hat{N}_{k|k}$ are obtained from a triangular decomposition of the float ambiguity covariance matrix $\Sigma_{\hat{N}}=LDL^T$ as $\sigma_{\hat{N}_{k|k}}^2=D(k,k)$. The success rate of the bootstrapped estimator depends on the order of ambiguity fixings and is given in [12] as $$P_s = \prod_{k=1}^{K-1}\Phi\left(\frac{1-2b_{\hat{N}_{k|k}}}{2\sigma_{\hat{N}_{k|k}}}\right) + \Phi\left(\frac{1+2b_{\hat{N}_{k|k}}}{2\sigma_{\hat{N}_{k|k}}}\right) - 1 \quad (51)$$

with the conditional biases $b_{\hat{N}_{k|k}}$ and $$\Phi(x) = \int_{-\infty}^{x}\frac{1}{\sqrt{2\pi}}\exp\left(-\frac{1}{2}v^2\right)dv. \quad (52)$$

The sequential fixing can be applied to the float ambiguities in original order or to a permutation of the float ambiguities, e.g. sorted w.r.t. the variances. The success rate of the bootstrapped estimator is significantly increased if an integer decorrelation transformation Z [12] is applied to the float ambiguities before sequential fixing.

Figure 6:
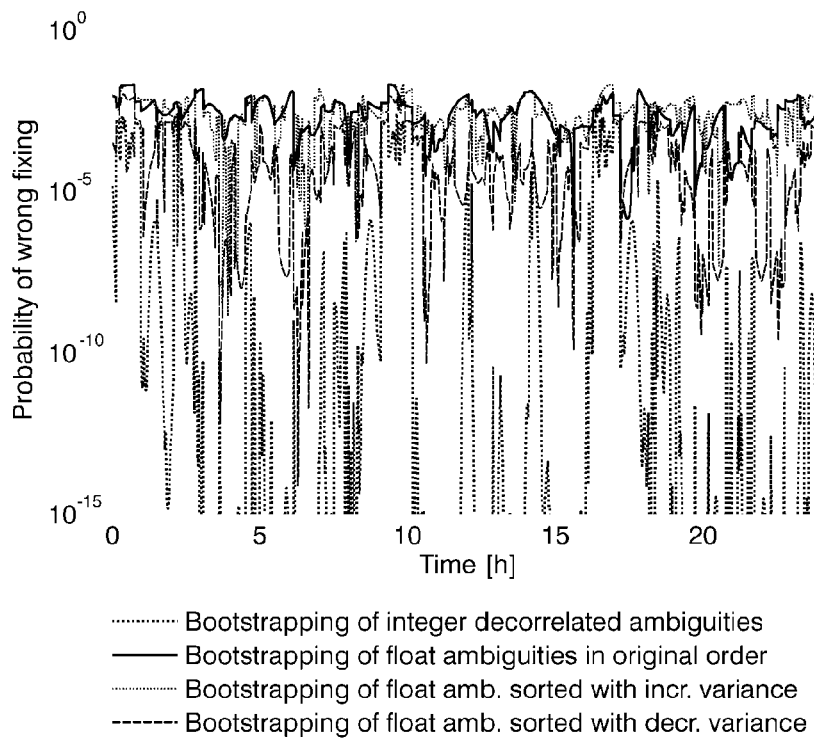
FIG. 6 shows single difference phase bias estimation with uncombined phase and code measurements on L1, E5a, E5b and E5c at a single reference station (Rates of iono./tropo. estimation: $R_I$=1/10s, $R_T$=1/120s).

FIG. 6 shows the probability of wrong fixing of SD ambiguities for different bootstrapping estimators and known biases. The integer decorrelation transformation reduces the error rate by up to ten orders of magnitude for some epochs. The high reliability of single epoch ambiguity fixing is caused by the large wavelength of $\lambda=3.215$ m and the low code noise level of the mixed code-carrier combination.

The conditional float ambiguity biases $b_{\hat{N}_{k|k}}$ (are related to the residual biases of the mixed code-carrier combination ($b_1$) and of the code-only combination ($b_2$) by $$\begin{bmatrix} b_{\hat{N}_1} \\ b_{\hat{N}_{2|1}} \\ \vdots \end{bmatrix} = L^{-1} b_{\hat{N}'} \qquad (53)$$

$$= L^{-1} Z b_{\hat{N}}$$

$$= \underbrace{L^{-1} Z P \left( X^T \sum^{-1} X \right)^{-1} X^T \sum^{-1}}_{[M_1, M_2]} \begin{bmatrix} b_1 \\ b_2 \end{bmatrix}$$

with $$X = \begin{bmatrix} H_0 & H_1 & H_2 \\ H_0 & 0 & H_2 \end{bmatrix} \qquad (54)$$

$$P = [0^{K-1 \times 3}, 1^{K-1 \times K-1}, 0^{K-1 \times 1}].$$

An upper bound for the k-th conditional ambiguity bias is given for $$-b_{c,max}^j < b_c^j < +b_{c,max}^j, \ c \in \{1, 2\} \text{ by} \qquad (55)$$

$$\max \left( b_{\hat{N}_{k|k}} \right) \le \sum_{j=1}^{K-1} |M_1(k, j)| \cdot b_{1,max}^j + \sum_{j=1}^{K-1} |M_2(k, j)| \cdot b_{2,max}^j.$$

Figure 7:
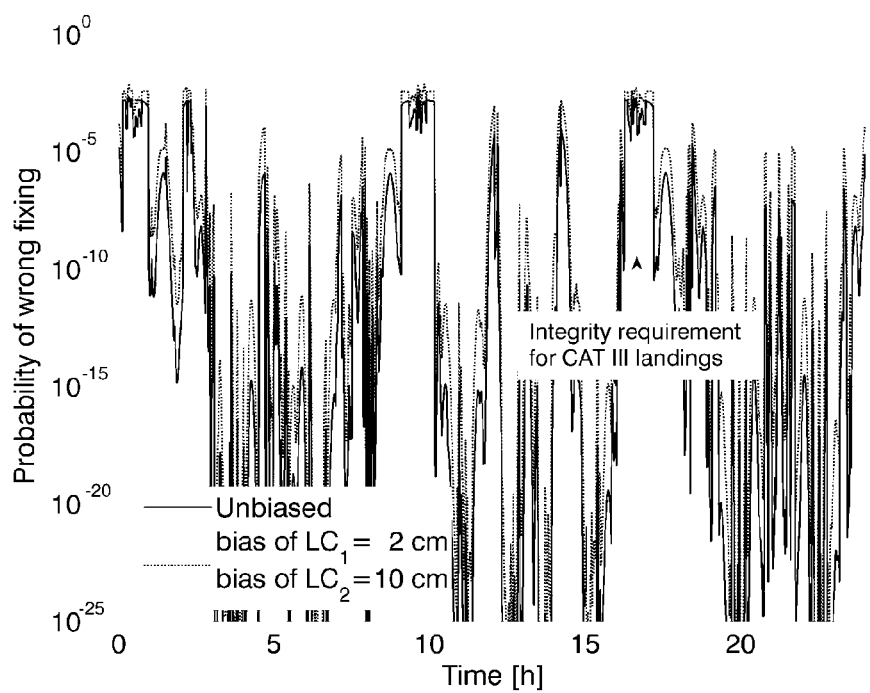
FIG. 7 shows the probability of wrong fixing of SD integer ambiguities of the ionosphere-free code-carrier linear combination ($\lambda$=3.215 m) for known biases and single epoch measurements.

FIG. 7 shows the impact of (uncorrected) residual SD biases on the probability of wrong fixing. A residual bias of 2 cm for the mixed code-carrier combination and of 10 cm for the code-only combination reduces the success rate only slightly due to the large wavelength of the linear combination.

The success rate of instantaneous ambiguity resolution can be significantly increased by using measurements from multiple epochs. Position and tropospheric wet zenith delay are estimated once per epoch for PPP.

Figure 8:
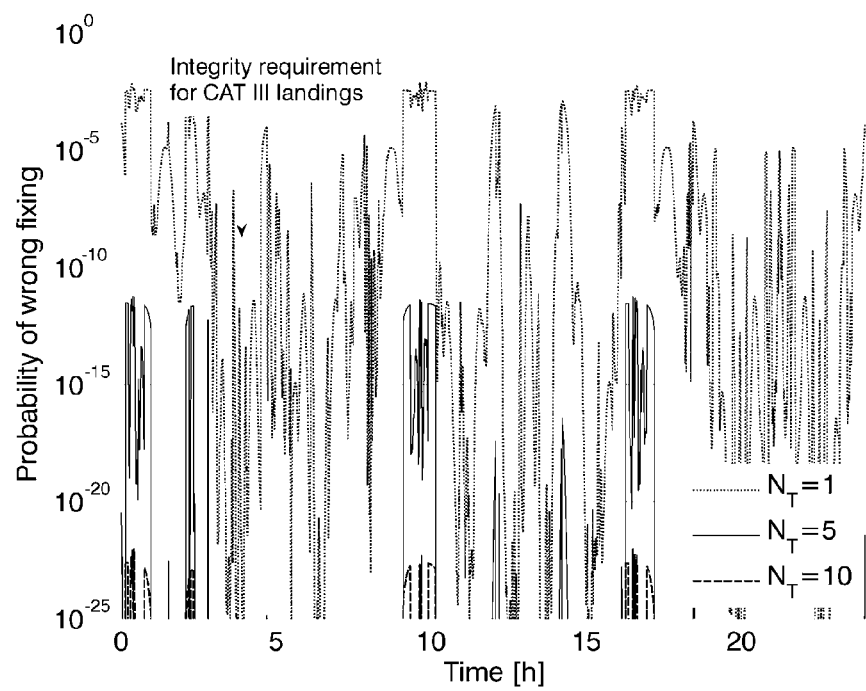
FIG. 8 demonstrates the impact of residual biases on the success rate of sequential integer ambiguity resolution: single epoch fixing of ionosphere-free code-carrier linear combination ($\lambda$=3.215 m) with integer decorrelation of float ambiguities.

FIG. 8 shows that the probability of wrong fixing can be reduced to less than $10^{-10}$ within 5 s. Consequently, CAT III requirements for aircraft landing can be fulfilled for ambiguity resolution of the mixed code-carrier combination.

After ambiguity fixing, the mixed-code carrier and code-only combinations of SD measurements are corrected by ambiguities/biases and the receiver position is estimated, i.e.

$$\hat{x} = S \left( X^T \sum^{-1} X \right)^{-1} X^T \sum^{-1} \begin{bmatrix} \lambda \tilde{\varphi} \\ \tilde{\rho} \end{bmatrix} \qquad (56)$$

with the selection matrix $S = \lfloor 1^{3 \times 3}, 0^{3 \times (K-1)}, 1^{3 \times 1} \rfloor$. The positioning accuracy is improved if the ionosphere-free carrier smoothing of [13] is applied to the mixed code-carrier combination. The smoothed linear combination is written as $$\lambda \bar{\varphi}(t_i) = \bar{\chi}(t_i) + \lambda_c \phi_c(t_i) \qquad (57)$$

with $\chi(t_i) = \lambda \phi(t_i) - \lambda_c \phi_c(t_i)$. This geometry-free, ionosphere-free term is filtered by a low pass filter, i.e.

$$\bar{\chi}(t_i) = \left( 1 - \frac{1}{\tau} \right) \bar{\chi}(t_{i-1}) + \frac{1}{\tau} \chi(t_i). \qquad (58)$$

The smoothing combination $\lambda_c \phi_c$ is geometry-preserving, ionosphere-free and of minimum noise. The variance of the smoothed mixed code-carrier combination is given by [5] as $$\sigma_n^2 = \sigma_c^2 + \frac{1}{2\tau_s - 1} \cdot (\sigma_n^2 + \sigma_c^2 - 2\sigma_{nc}) + \frac{2}{\tau_s} \cdot (\sigma_{nc} - \sigma_c^2) \qquad (59)$$

with the smoothing time constant $\tau_s$, the variance $\sigma_c^2$ of the smoothing combination, the variance $\sigma_n^2$ of the unsmoothed mixed code-carrier combination and the covariance $\sigma_{nc}$ between these two combinations. The L1-E5 smoothing combination has a noise level of $\sigma_c$=2.7 mm and allows a noise reduction of the mixed code-carrier combination from 3.76 cm to 3.7 mm for $\tau_s$=120 s.

Figure 9:
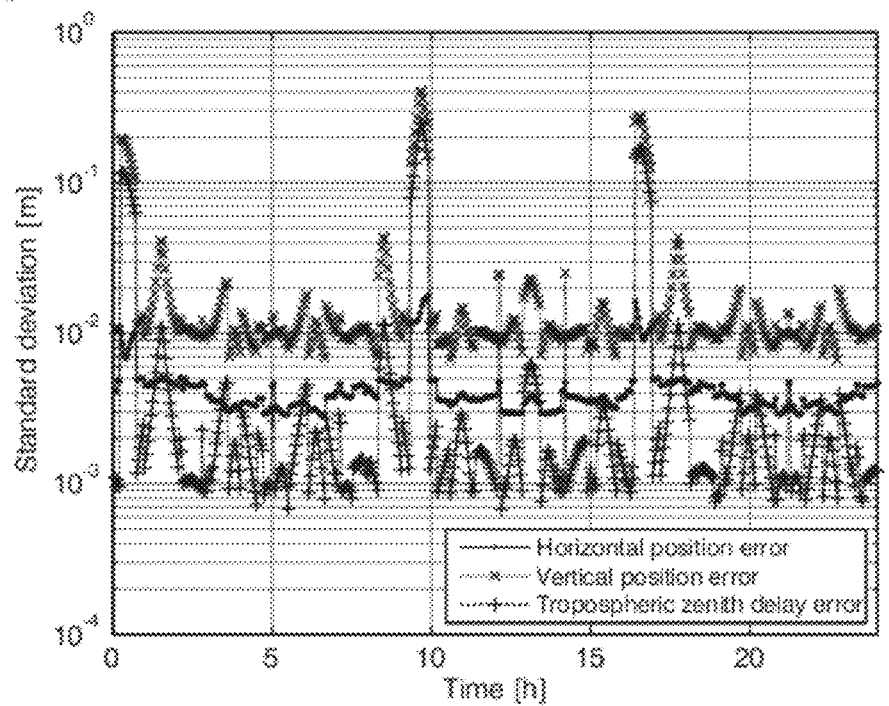
FIG. 9 illustrates multi-epoch sequential ambiguity fixing of ionosphere-free code-carrier linear combination ($\lambda$=3.215 m) with integer decorrelation: Residual biases of 2 cm for code-carrier combination and 10 cm for code-only comb.

FIG. 9 shows the single epoch positioning accuracy with SD measurements by 120 s ionosphere-free carrier smoothing of the ionosphere-free code-carrier combination with $\lambda$=3.215 m, aided by a code-only combination. FIG. 9 further shows a standard deviation of a few millimeters for the horizontal position and of less than 5 cm for the vertical position in 90% of the epochs. A high correlation between the vertical position error and tropospheric zenith delay is observed and degrades the vertical positioning accuracy to a few decimeters for a few epochs.

Figure 10:
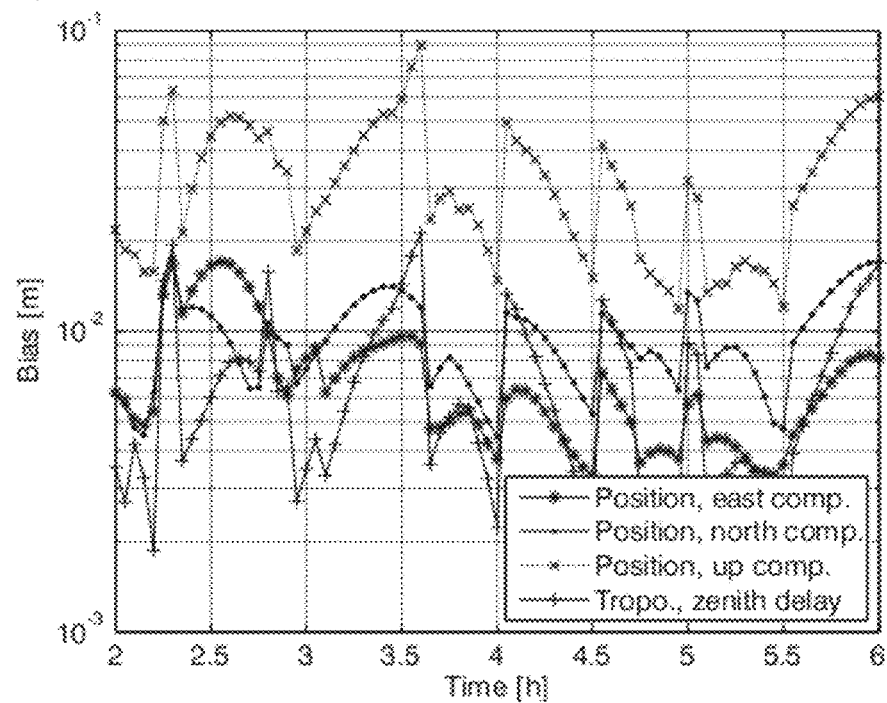
FIG. 10 shows the single epoch positioning accuracy with SD measurements by 120 s ionosphere-free carrier smoothing of the ionosphere-free code-carrier combination with $\lambda$=3.215 m, aided by a code-only combination.

The bias estimation at the reference station leaves some residual biases whose impact on the position is shown in FIG. 10. The mixed-code carrier SD residual biases have been chosen according to the standard deviations of FIG. 3. The residual biases of the code-only SD combination are assumed to be 10 times larger. The vertical position bias is highly correlated with the tropospheric zenith delay bias and varies between 1 cm and 10 cm.

A comparison of FIGS. 9 and 10 shows that standard deviation and bias of the receiver position are characterized by a similar order of magnitude although the biases are slightly more critical. The lower standard deviation is achieved by the ionosphere-free carrier smoothing which does not affect the biases of the mixed code-carrier combination.

4. PPP with Satellite-Satellite SD Measurements Without Linear Combinations

The estimation of SD phase and code biases on each frequency is not feasible as at least one bias can not be distinguished from the ionospheric delay. However, the Galileo E5a and E5b signals are modulated onto the same carrier which motivates the assumption of a common bias. In this case, the L1 and E5 SD code and phase biases can be determined separately. The accuracy can be increased if the E5c signal which corresponds to the central lobe between E5a and E5b is also taken into account.

First, the widelane ambiguities between E5a and E5b ($\lambda$=9.76 m) as well as between E5a and E5c ($\lambda$=19.52 m) are determined with the Melbourne-Wubbena combination [1]. Thus, the three E5 ambiguities and phase biases are reduced to a single ambiguity and a single phase bias. The SD code and phase measurements on all four frequencies are modeled for a reference station 15 of known position as $$\tilde{y} = y - A_0 \Delta r \qquad (60)$$

$$= A_1 \Delta b_\phi + A_2 \Delta b_\rho + A_3 \Delta I_1 + A_4 \frac{\partial}{\partial t} \Delta I_1 +$$

$$A_5 T_z + A_6 \frac{\partial}{\partial t} T_z + \varepsilon$$

with $$A_1 = 1^{N_T \times 1} \otimes \begin{bmatrix} \lambda_1 & 0 \\ 0 & \lambda_2 \\ 0 & \lambda_3 \\ 0 & \lambda_4 \\ 0^{4\times 1} & 0^{4\times 1} \end{bmatrix} \otimes 1^{(K-1)\times(K-1)} \quad (61)$$

$$A_2 = 1^{N_T \times 1} \otimes \begin{bmatrix} 1^{4\times 1} & 1^{4\times 1} \\ 1 & 0 \\ 0^{3\times 1} & 1^{3\times 1} \end{bmatrix} \otimes 1^{(K-1)\times(K-1)}$$

$$A_3 = 1^{N_T \times 1} \otimes A_I$$

$$= 1^{N_T \times 1} \otimes \begin{bmatrix} +q_{11}^2 \\ \vdots \\ +q_{14}^2 \\ -q_{11}^2 \\ \vdots \\ -q_{14}^2 \end{bmatrix} \otimes 1^{(K-1)\times(K-1)}$$

$$A_5 = \begin{bmatrix} 1^{8\times 1} \otimes \Delta m_w(t_1) \\ \vdots \\ 1^{8\times 1} \otimes \Delta m_w(t_N) \end{bmatrix}$$

Both ionospheric and tropospheric delays are assumed piecewise linear. The design matrices for ionospheric/tropospheric gradients are given by $$A_4 = \begin{bmatrix} 1\delta t & 0 & 0 & \cdots \\ 2\delta t & 0 & 0 & \cdots \\ \vdots & \vdots & \vdots & \\ \delta t/r_I & 0 & 0 & \\ \delta t/r_I & 1\delta t & 0 & \cdots \\ \delta t/r_I & 2\delta t & 0 & \cdots \\ \vdots & \vdots & \vdots & \\ \delta t/r_I & \delta t/r_I & 0 & \\ \delta t/r_I & \delta t/r_I & 1\delta t & \\ \vdots & \vdots & \vdots & \end{bmatrix} \otimes A_I \quad (62)$$

$$A_6 = \begin{bmatrix} 1^{8\times 1} \otimes \Delta m_w(t_1) & & \\ & \ddots & \\ & & 1^{8\times 1} \otimes \Delta m_w(t_N) \end{bmatrix}.$$

$$\begin{bmatrix} 1\delta t & 0 & 0 & \cdots \\ 2\delta t & 0 & 0 & \cdots \\ \vdots & \vdots & \vdots & \\ \delta t/r_T & 0 & 0 & \\ \delta t/r_T & 1\delta t & 0 & \cdots \\ \delta t/r_T & 2\delta t & 0 & \cdots \\ \vdots & \vdots & \vdots & \\ \delta t/r_T & \delta t/r_T & 0 & \\ \delta t/r_T & \delta t/r_T & 1\delta t & \\ \vdots & \vdots & \vdots & \end{bmatrix}$$

where $r_I$ and $r_T$ denote the rate of ionospheric/tropospheric gradient estimation and $\delta t$ represents the time interval between two measurements. Both ionosphere and troposphere are nuisance parameters for bias estimation and are eliminated by an orthogonal projection [14]. The phase bias estimates are obtained as $$\Delta \hat{b}_\phi = (\overline{A}_1^T \Sigma^{-1} \overline{A}_1)^{-1} \overline{A}_1^T \Sigma^{-1} \tilde{y} \quad (63)$$

with $$\overline{A}_1 = P_{A_2,\ldots,6}^\perp A_1 \text{ and } A_{2,\ldots,6} = [A_2,\ldots,A_6] \quad (64)$$

and the orthogonal projection $$P_{A_2,\ldots,6}^\perp = 1 - A_{2,\ldots,6}(A_{2,\ldots,6}^T \Sigma^{-1} A_{2,\ldots,6})^{-1} A_{2,\ldots,6}^T \Sigma^{-1}. \quad (65)$$

Moreover, the complexity can be further reduced if the sparse properties of $A_1, \ldots, A_6$ and the block diagonal structure of the covariance matrix $\Sigma$ are taken into account.

Figure 11:
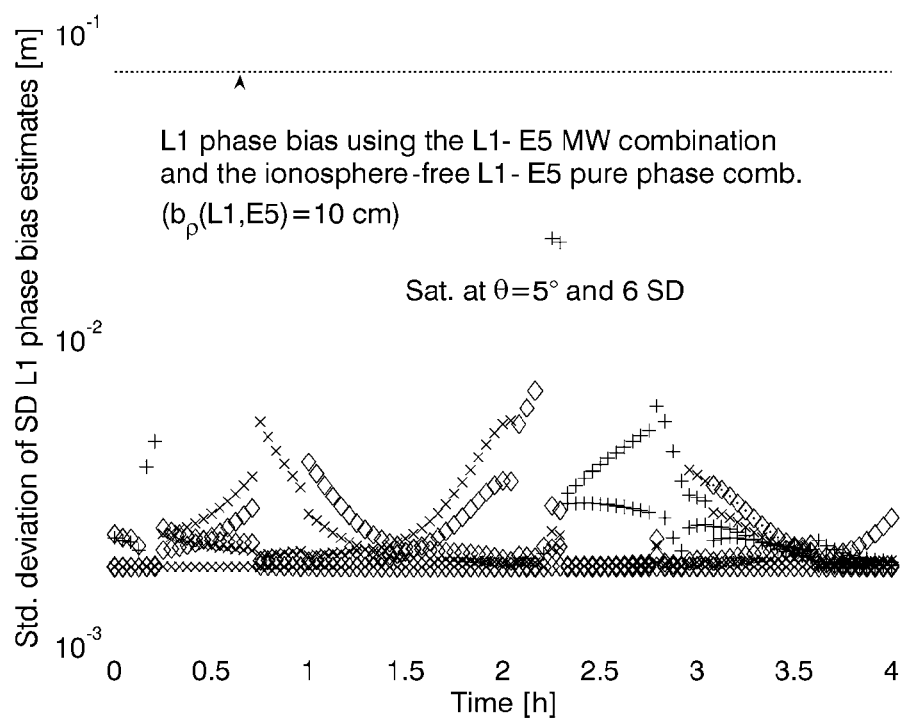
FIG. 11 demonstrates the impact of residual biases form FIG. 3 on single epoch positioning with SD measurement by 120 s ionosphere-free carrier smoothing of the ionosphere-free code-carrier combination with $\lambda$=3.215 m, aided by a code-only combination.

FIG. 11 shows the achievable accuracy for SD phase bias estimation with uncombined phase and code measurements at a single reference station. Simulated 1 Hz measurements on L1, E5a, E5b and E5c have been generated for periods of 10 min. A phase noise of $\sigma_\phi = 1$ mm has been assumed and the code noise has been chosen according to the CRB for 45 dBHz, i.e. $\sigma_{\rho_1} = 11.80$ cm for E1 (MBOC(6,1,1/11), 20 MHz), $\sigma_{\rho_{2,3}} = 8.29$ cm for E5a/b (BPSK(10), 20 MHz) and $\sigma_{\rho_4} = 15.10$ cm for E5c (AltBOC(15,10), 10 MHz). The ionospheric gradients are estimated once per 10 s and the gradient of the tropospheric wet zenith delay is updated every 120 s.

The standard deviation of the SD L1 phase bias estimates varies between 2 mm and 7 mm with the exception of two epochs where one SD shows a standard deviation of 2 cm. This outlier is explained by the low elevation angle) (5°) of the respective satellite and the low number of visible satellites. This SD phase bias can be determined more accurately at a different reference station.

The standard deviation of SD phase bias estimates in FIG. 11 is one to two orders of magnitude lower than the weighted code bias ($b_{\rho_{\{1,2\}}} = 10$ cm) in the L1 phase bias estimate of (38). The uncombined phase biases might also be beneficial for single frequency receivers which can not form the MW combination.

5. Advantages

Precise point positioning with satellite-satellite single difference measurements requires precise estimates of the phase and code biases for ambiguity resolution.

A method for satellite-satellite single difference bias estimation has been described for precise point positioning. It uses an ionosphere-free mixed code-carrier combination of maximum ambiguity discrimination defined as ratio between wavelength and noise standard deviation. The L1-E5 linear combination of maximum discrimination is characterized by a wavelength of 3.215 m, a low noise level of 3.76 cm, and an E1 code multipath suppression by 23.5 dB. The wavelength of 3.215 m of the L1-E5 linear combination of maximum discrimination is four time larger than the wavelength of the L1-E5 Melbourne-Wübbena combination. In contrast to the Melbourne-Wübbena combination, the proposed mixed code-carrier combination is a geometry-preserving linear combination so that the bias estimates are directly applicable at the mobile receiver 5. The single difference biases of the discrimination maximizing linear combination are determined at a single reference station 15 with an accuracy between a few millimeters and 1 cm within 5 min. As these biases refer to a geometry-preserving linear combination, they are directly applicable at the mobile navigation device 5.

The accuracy of bias estimation is further improved by an additional ionosphere-free L1-E5 mixed code-carrier combination of time-differenced measurements that is uncorrelated with the discrimination maximizing combination. The additional combination uses time-differenced measurements to avoid the introduction of additional ambiguities and biases.

Moreover, the SD phase and code biases on L1 and E5 can also be determined separately by subdividing the Galileo E5 band into the E5a, E5b and E5c band whereas the latter one corresponds to the central lobe between E5a and E5b.

The methods described above can also be implemented in software products that contain program code for performing the methods. The software product can in particular be stored on a computer readable storage medium or data carrier that can also be an electrical signal of a data network.

Generally, it should be noted that linear operations on phase or code signals can be performed in any order. For instance, the subtraction 20 of the know ranges and clock offsets in FIG. 2 can also be performed before the computation 19 of satellite-satellite single differences. In a corresponding way, the sequence of any other linear operations can be inverted.

As mentioned before the functional units may be implemented by hardware or by software code that my be contained by a computer program product, that contains code for implementing the method described herein, if the code is executed by a processor. In some embodiments, the computer program product may be code stored on a computer readable data carrier such as a disc, a compact disc or a digital versatile disc or the like. In other embodiments, the computer program product may also be code stored on a data storage unit on a server or an array of servers. Such a data storage unit may be a hard disc or an array of hard disc or the like. In further embodiments, the data carrier may also be an electrical carrier signal that can be used for transferring the code from a server, which can be used for downloading the program code.

It should further be noted that, throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds or groups described in conjunction with a particular aspect, embodiment or example of the invention are further to be understood to be applicable to any other aspect, embodiment or example described herein unless incompatible therewith.

TABLE 1

Cramer Rao Bounds for $C/N_0 = 45$ dB/Hz

| Signal | | BW [MHz] | $\Gamma$ [cm] |
|---|---|---|---|
| E1 | MBOC | 20 | 11.14 |
| E5 | AltBOC(15, 10) | 51 | 1.95 |
| E5a | BPSK(10) | 20 | 7.83 |
| E5b | BPSK(10) | 20 | 7.83 |
| E6 | BOC(10, 5) | 40 | 2.41 |

TABLE 2

GP-IF-NP mixed code-carrier widelane combinations of max. discrimination for $\sigma_\phi = 1$ mm, $\sigma_{\rho_m} = \Gamma_m$

| | E1 | E5a | E5b | E5 | E6 | $\lambda$ | $\sigma_n$ | D |
|---|---|---|---|---|---|---|---|---|
| $j_m$ | 1.0000 | | | −1.0000 | | 3.285 m | 6.5 cm | 25.1 |
| $\alpha_m$ | 17.2629 | | | −13.0593 | | | | |
| $\beta_m$ | −0.0552 | | | −3.1484 | | | | |
| $j_m$ | 1.0000 | −1.0000 | | | | 4.309 m | 31.4 cm | 6.9 |
| $\alpha_m$ | 22.6467 | −16.9115 | | | | | | |
| $\beta_m$ | −1.0227 | −3.7125 | | | | | | |
| $j_m$ | 1.0000 | 4.0000 | −5.0000 | | | 3.531 m | 13.3 cm | 13.3 |
| $\alpha_m$ | 18.5565 | 55.4284 | −71.0930 | | | | | |
| $\beta_m$ | −0.2342 | −0.8502 | −0.8075 | | | | | |
| $j_m$ | 1.0000 | | | 1.0000 | −2.0000 | 4.019 m | 5.1 cm | 39.2 |
| $\alpha_m$ | 21.1223 | | | 15.9789 | −34.2894 | | | |
| $\beta_m$ | −0.0200 | | | −1.1422 | −0.6495 | | | |
| $j_m$ | 1.0000 | 1.0000 | 0.0000 | | −2.0000 | 4.469 m | 6.3 cm | 35.3 |
| $\alpha_m$ | 23.4845 | 17.5371 | 0.0000 | | −38.1242 | | | |
| $\beta_m$ | −0.0468 | −0.1700 | −0.1615 | | −1.5191 | | | |
| $j_m$ | 1.0000 | 1.0000 | 0.0000 | 0.0000 | −2.0000 | 3.9387 m | 4.8 cm | 41.0 |
| $\alpha_m$ | 20.6978 | 15.4562 | 0.0000 | 0.0000 | −33.6004 | | | |
| $\beta_m$ | −0.0159 | −0.0578 | −0.0549 | −0.9084 | −0.5166 | | | |

TABLE 3

GP-IF-NP mixed code-carrier widelane and narrowlane combinations of maximum ambiguity discrimination for $\sigma_\phi = 2$ mm, $\sigma_{\rho_m} = 3 \cdot \Gamma_m$

| | E1 | E5a | E5b | E5 | E6 | $\lambda$ | $\sigma_n$ | D |
|---|---|---|---|---|---|---|---|---|
| $j_m$ | 1.0000 | | | −1.0000 | | 3.285 m | 19.0 cm | 8.6 |
| $\alpha_m$ | 17.2629 | | | −13.0593 | | | | |
| $\beta_m$ | −0.0552 | | | −3.1484 | | | | |
| $j_m$ | 1.0000 | −1.0000 | | | | 4.309 m | 93.8 cm | 2.3 |
| $\alpha_m$ | 22.6467 | −16.9115 | | | | | | |
| $\beta_m$ | −1.0227 | −3.7125 | | | | | | |
| $j_m$ | 1.0000 | 4.0000 | −5.0000 | | | 3.531 m | 34.0 cm | 5.2 |
| $\alpha_m$ | 18.5565 | 55.4284 | −71.0930 | | | | | |
| $\beta_m$ | −0.2342 | −0.8502 | −0.8075 | | | | | |
| $j_m$ | 1.0000 | | | 1.0000 | −2.0000 | 4.019 m | 11.9 cm | 16.9 |
| $\alpha_m$ | 21.1223 | | | 15.9789 | −34.2894 | | | |

TABLE 3-continued

GP-IF-NP mixed code-carrier widelane and narrowlane combinations of maximum ambiguity discrimination for $\sigma_\phi = 2$ mm, $\sigma_{\rho_m} = 3 \cdot \Gamma_m$

|  | E1 | E5a | E5b | E5 | E6 | λ | $\sigma_n$ | D |
|---|---|---|---|---|---|---|---|---|
| $\beta_m$ | −0.0200 |  |  | −1.1422 | −0.6495 |  |  |  |
| $j_m$ | 1.0000 | 1.0000 | 1.0000 |  | −3.0000 | 4.284 m | 13.7 cm | 15.6 |
| $\alpha_m$ | 22.5147 | 16.8130 | 17.2516 |  | −54.8249 |  |  |  |
| $\beta_m$ | −0.0186 | −0.0676 | −0.0642 |  | −0.6040 |  |  |  |
| $j_m$ | 1.0000 | 1.0000 | 0.0000 | 0.0000 | −2.0000 | 3.9387 m | 10.9 cm | 18.1 |
| $\alpha_m$ | 20.6978 | 15.4562 | 0.0000 | 0.0000 | −33.6004 |  |  |  |
| $\beta_m$ | −0.0159 | −0.0578 | −0.0549 | −0.9084 | −0.5166 |  |  |  |
| $j_m$ | 4.0000 |  |  | −3.0000 |  | 10.87 cm | 5.3 mm | 10.3 |
| $\alpha_m$ | 2.2853 |  |  | −1.2966 |  |  |  |  |
| $\beta_m$ | 0.0002 |  |  | 0.0111 |  |  |  |  |
| $j_m$ | 4.0000 | −3.0000 |  |  |  | 10.88 cm | 5.4 mm | 10.1 |
| $\alpha_m$ | 2.2870 | −1.2809 |  |  |  |  |  |  |
| $\beta_m$ | −0.0013 | −0.0048 |  |  |  |  |  |  |
| $j_m$ | 4.0000 | −2.0000 | −1.0000 |  |  | 10.87 cm | 5.0 mm | 10.8 |
| $\alpha_m$ | 2.2853 | −0.8533 | −0.4378 |  |  |  |  |  |
| $\beta_m$ | 0.0007 | 0.0026 | 0.0025 |  |  |  |  |  |
| $j_m$ | 4.0000 |  |  | −3.0000 | 0.0000 | 10.87 cm | 5.3 mm | 10.3 |
| $\alpha_m$ | 2.2841 |  |  | −1.2959 | 0.0000 |  |  |  |
| $\beta_m$ | 0.0001 |  |  | 0.0075 | 0.0042 |  |  |  |
| $j_m$ | 4.0000 | −2.0000 | −1.0000 |  | 0.0000 | 10.87 cm | 5.0 mm | 10.9 |
| $\alpha_m$ | 2.2844 | −0.8529 | −0.4376 |  | 0.0000 |  |  |  |
| $\beta_m$ | 0.0002 | 0.0006 | 0.0005 |  | 0.0049 |  |  |  |
| $j_m$ | 4.0000 | −1.0000 | −1.0000 | −1.0000 | 0.0000 | 10.87 cm | 4.8 mm | 11.2 |
| $\alpha_m$ | 2.2845 | −0.4265 | −0.4376 | −0.4321 | 0.0000 |  |  |  |
| $\beta_m$ | 0.0002 | 0.0004 | 0.0004 | 0.0068 | 0.0039 |  |  |  |

TABLE 4

GP-IF-NP mixed code-carrier widelane combination of maximum ambiguity discrimination $D = \frac{\lambda}{2\sigma_n}$ for $\sigma_\varphi = 1$ mm, $\sigma_{\rho_m} = \Gamma_m$ with constraint worst-case combination biases for $b_{\varphi_m} = 1$ cm and $b_{\rho_m} = 5$ cm on all frequencies

|  | E1 | E5a | E5b | λ | $\sigma_n$ | $b_n$ | D |
|---|---|---|---|---|---|---|---|
| $j_m$ | 0.0000 | 1.0000 | −1.0000 | 0.986 m | 26.9 cm | 25.0 cm | 1.84 |
| $\alpha_m$ | 0.0000 | 3.8699 | −3.9708 |  |  |  |  |
| $\beta_m$ | 2.2890 | −0.7957 | 0.0000 |  |  |  |  |
| $j_m$ | 0.0000 | 1.0000 | −1.0000 | 1.475 m | 27.4 cm | 30.0 cm | 2.69 |
| $\alpha_m$ | 0.0000 | −5.7874 | 5.9384 |  |  |  |  |
| $\beta_m$ | 2.2519 | −1.4029 | 0.0000 |  |  |  |  |
| $j_m$ | 0.0000 | 1.0000 | −1.0000 | 2.320 m | 26.6 cm | 35.0 cm | 4.35 |
| $\alpha_m$ | 0.0000 | 9.1037 | −9.3412 |  |  |  |  |
| $\beta_m$ | 2.2743 | −1.0368 | 0.0000 |  |  |  |  |
| $j_m$ | 1.0000 | −1.0000 | 0.0000 | 2.726 m | 22.2 cm | 40.0 cm | 6.15 |
| $\alpha_m$ | 14.3260 | −10.6980 | 0.0000 |  |  |  |  |
| $\beta_m$ | 0.1836 | −2.8116 | 0.0000 |  |  |  |  |

TABLE 5

GP-IF-NP mixed code-carrier widelane combinations of maximum discrimination $D = \frac{\lambda}{\sigma_n + b_n}$ for $\sigma_\varphi = 1$ mm, $\sigma_{\rho_m} = \Gamma_m$ for $b_{\varphi_m} = 1$ cm and $b_{\rho_m} = 5$ cm on all frequencies

|  | E1 | E5a | E5b | λ | $\sigma_n$ | $b_n$ | D |
|---|---|---|---|---|---|---|---|
| $j_m$ | 1.0000 | 0.0000 | −1.0000 | 0.80 m | 21.7 cm | 24.3 cm | 1.74 |
| $\alpha_m$ | 4.2040 | 0.0000 | −3.2213 |  |  |  |  |
| $\beta_m$ | 1.6978 | −1.3107 | −0.3699 |  |  |  |  |
| $j_m$ | 1.0000 | 0.0000 | −1.0000 | 1.00 m | 20.6 cm | 26.0 cm | 2.15 |
| $\alpha_m$ | 5.2550 | 0.0000 | −4.0266 |  |  |  |  |
| $\beta_m$ | 1.5554 | −1.3366 | −0.4472 |  |  |  |  |
| $j_m$ | 1.0000 | 0.0000 | −1.0000 | 2.00 m | 16.3 cm | 34.3 cm | 3.96 |
| $\alpha_m$ | 10.5101 | 0.0000 | −8.0532 |  |  |  |  |
| $\beta_m$ | 0.8414 | −1.4805 | −0.8178 |  |  |  |  |
| $j_m$ | 1.0000 | 0.0000 | −1.0000 | 3.00 m | 16.0 cm | 42.5 cm | 5.13 |
| $\alpha_m$ | 15.7651 | 0.0000 | −12.0798 |  |  |  |  |
| $\beta_m$ | 0.1229 | −1.6604 | −1.1478 |  |  |  |  |
| $j_m$ | 0.0000 | 1.0000 | −1.0000 | 4.00 m | 26.6 cm | 48.1 cm | 5.36 |
| $\alpha_m$ | 0.0000 | 15.6969 | −16.1063 |  |  |  |  |
| $\beta_m$ | 2.3306 | −0.5115 | −0.4097 |  |  |  |  |
| $j_m$ | 0.0000 | 1.0000 | −1.0000 | 5.00 m | 26.5 cm | 55.5 cm | 6.10 |
| $\alpha_m$ | 0.0000 | 19.6211 | −20.1329 |  |  |  |  |
| $\beta_m$ | 2.3310 | −0.4579 | −0.3613 |  |  |  |  |

References

[1] G. Wübbena, *Software developments for geodetic positioning with GPS using TI-4100 code and carrier measurements*, Proc. of 1-st Intern. Symposium on Precise Positioning with the Global Positioning System, Rockville, USA, pp. 403-412, April 1985.

[2] M. Gabor and S. Nerem, *Satellite-satellite single difference phase calibration as applied to ambiguity resolution*, Navigation, Vol. 49, Nr. 4, pp. 223-242, 2002.

[3] M. Ge, G. Gendt, M. Rothacher, C. Shi and J. Liu, *Resolution of GPS carrier-phase ambiguities in Precise Point Positioning (PPP) with daily observations*, Journal of Geodesy, Springer, October 2007.

[4] D. Laurichesse and F. Mercier, *Integer ambiguity resolution on undifferenced GPS phase measurements and its application to PPP*, Proc. of ION-GNSS, Forth Worth, USA, September 2007.

[5] P. Henkel and C. Günther, *Joint L/C-Band Code-Carrier Linear Combinations for Galileo*, International Journal of Navigation and Observation, Special Issue on Future GNSS Signals, Hindawi Publ., January 2008.

[6] P. Teunissen, *An optimal property of the integer least-square estimator*, Journal of Geodesy, Vol. 73, Nr. 11, pp. 587-593, Springer, July 1999.

[7] G. Hein, J. Godet, J.-L. Issler, J. Martin, P. Erhard, R. Lucas-Rodriguez and T. Pratt, *Status of Galileo frequency and signal design*, Proc. of ION-GPS, Portland, USA, 2002.

[8] G. Hein, J. Avila-Rodriguez, S. Wallner, A. Pratt, J. Owen, J.-L. Issler. J. Betz, C. Hegarty, S. Lenahan, J. Rushanan, A. Kraay and T. Stansell, *MBOC: The New Optimized Spreading Modulation Recommended for GALILEO L1 OS and GPS L1C*, Proc. of the IEEE/ION PLANS, San Diego, pp. 883-892, April 2006.

[9] *Galileo Open Service Signal-in-Space ICD*, available online: http://www.galileoju.com, Mai 2006.

[10] A. Niell, *Global Mapping Functions for the Atmosphere Delay at Radio Wavelengths*, Journal of Geophysical Research, Vol. 101, pp. 3227-3246, 1996.

[11] G. Blewitt, *Carrier-phase ambiguity resolution for the Global Positioning System applied to geodetic baselines up to 2000 km*, Journal Geophysic Research, Vol. 94, pp. 10187-10203, 1989.

[12] P. Teunissen, *Integer estimation in the presence of biases*, Journal of Geodesy, Vol. 75, Nr. 11, pp. 399-407, Springer, March 2001.

[13] R. Hatch, *A new three frequency, geometry-free technique for ambiguity resolution*, Proc. of ION-GNSS, Fort Worth, USA, pp. 309-316, 2006.

[14] P. Teunissen, *Adjustment Theory: Partitioned model representations*, Series on Mathematical Geodesy and Positioning, Delft University Press, 2000.

[15] J. Betz, *Binary Offset Carrier Modulations for Radionavigation*, Navigation, Vol. 48, No. 4, pp. 227-246, 2002.

What is claimed is:

1. A method for a global satellite navigation system with at least two carriers, comprising the actions of:
   forming a linear combination from the at least two carriers by a reference station for estimating a satellite-satellite single difference phase and code bias, and
   providing the estimated bias to a mobile receiver, enabling the mobile receiver to compute the same linear combination, to subtract the bias from the linear combination and to determine integer phase ambiguities,
   wherein the satellite-satellite single difference bias of a single ionosphere-free, geometry-preserving combination of the code and phase signals of at least two carriers is determined by using a maximum combination discrimination requirement or a minimum noise requirement for the linear combination,
   wherein an additional geometry-preserving, ionosphere-free code-carrier combination of time differences of measurements or time differences of geometry-preserving, ionosphere-free code-carrier combinations of measurements are used for determining the bias, and
   wherein the weighting coefficients of the additional combination fulfill the requirement that the additional combination and the other combination are uncorrelated.

2. The method according to claim 1, wherein an ionosphere-free mixed code-carrier bias, integer phase ambiguities and tropospheric wet zenith delays are obtained by the reference station using a least-square estimation.

3. The method according to claim 1, wherein the combination discrimination requirement is defined as the ratio of the wavelength of the combination and the weighted sum formed by the bias of the combination and by the standard deviation of the combination.

4. The method according to claim 3, wherein the combination discrimination requirement is defined as the ratio of the wavelength of the combination and standard deviation of the mixed code-carrier combination noise.

5. The method according to claim 1, wherein the reference station is transmitting the bias together with the standard deviation associated with the bias.

6. The method according to claim 1, wherein the received code signal $\rho_{u,m}^k(t_i)$ and carrier phase signal $\phi_{u,m}^k(t_i)$ at receiver u from satellite k on frequency m at epoch i is modeled as:

$$\rho_{u,m}^k(t_i) = r_u^k(t_i) + \delta r_u^k(t_i) + c(\delta\tau_u(t_i) - \delta\tau^k) +$$

$$q_{1m}^2 I_u^k(t_i) + T_u^k(t_i) + b_{\rho_{u,m}} + b_{\rho_m}^k + \varepsilon_{\rho_{u,m}}^k(t_i)$$

$$\lambda_m \phi_{u,m}^k(t_i) = r_u^k(t_i) + \delta r_u^k(t_i) + c(\delta\tau_u(t_i) - \delta\tau^k) - q_{1m}^2 I_u^k(t_i) +$$

$$T_u^k(t_i) + \lambda_m N_{u,m}^k + \lambda_m b_{\phi_{u,m}} + \lambda_m b_{\phi_m}^k + \varepsilon_{\phi_{u,m}}^k(t_i)$$

with:
the receiver-satellite range $r_u^k(t_i)$,
the projected orbital error $\delta r_u^k(t_i)$,
the receiver / satellite clock errors $\{c\delta\tau_u, c\delta\tau^k\}$,
the ionospheric delay $I_u^k$,
the ratio of frequencies $q_{ij}=f_i/f_j$,
the tropospheric delay $T_u^k$,
the integer ambiguity $N_{u,m}^k$,
the receiver code/ phase bias $b_{\rho_{u,m}}$, $b_{\phi_{u,m}}$,
the satellite code/ phase bias $b_{\rho_m}^k$, $b_{\phi_m}^k$
and code/ carrier phase noise $\varepsilon_{\rho_{u,m}}^k(t_i)$, $\varepsilon_{\phi_{u,m}}^k(y_i)$ including multipath.

7. The method according to claim 6, wherein the satellite-satellite single difference code and carrier phase received from satellite k and satellite l are obtained as:

$$\rho_{u,m}^{kl}(t_i) = r_u^{kl}(t_i) + q_{1m}^2 I_u^{kl}(t_i) + T_u^{kl}(t_i) + b_{\rho_m}^{kl} + \varepsilon_{\rho_{u,m}}^{kl}(t_i)$$

$$\lambda_m \phi_{u,m}^{kl}(t_i) = r_u^{kl}(t_i) - q_{1m}^2 I_u^{kl}(t_i) + T_u^{kl}(t_i) + \lambda_m N_{u,m}^{kl} + \lambda_m b_{\phi_m}^{kl} + \varepsilon_{\phi_{u,m}}^{kl}(t_i)$$

where the single difference clock biases and the projected single difference orbital errors are mapped to the single difference code and phase biases.

8. The method according to claim 7, wherein the phase weights $\alpha_m$ and code weights $\beta_m$ of the ionosphere-free geometry-preserving code-carrier linear combination $$\sum_{m=1}^{M} \alpha_m \lambda_m \varphi_m + \sum_{m=1}^{M} \beta_m \rho_m$$

of the code and phase signals at M frequencies are constraint by $$\sum_{m=1}^{M} \alpha_m + \sum_{m=1}^{M} \beta_m = 1.$$

and by $$\sum_{m=1}^{M} \alpha_m q_{1m}^2 - \sum_{m=1}^{M} \beta_m q_{1m}^2 = 0.$$

9. The method according to claim 8, wherein the linear combination is periodic with wavelength $\lambda$ and the phase weights $\alpha_m$ can be written as $$\alpha_m = \frac{j_m \lambda}{\lambda_m}$$

where $j_m$ denotes an integer.

10. The method according to claim 9, wherein the minimum noise requirement is given by $$\frac{\partial \sigma_n^2(\lambda, \beta_1)}{\partial \lambda} \stackrel{!}{=} 0 \text{ and } \frac{\partial \sigma_n^2(\lambda, \beta_1)}{\partial \beta_1} \stackrel{!}{=} 0$$

and $$\frac{\partial^2 \sigma_n^2(\lambda, \beta_1)}{\partial \lambda^2} \cdot \frac{\partial^2 \sigma_n^2(\lambda, \beta_1)}{\partial \beta_1^2} - \left(\frac{\partial}{\partial \lambda}\frac{\partial}{\partial \beta_1}\sigma_n^2(\lambda, \beta_1)\right)^2 \stackrel{!}{>} 0$$

wherein $\sigma_n^2$ is the variance of the linear code-carrier combination given by $$\sigma_n^2 = \sum_{m=1}^{M} \alpha_m^2 \sigma_{\phi_m}^2 + \beta_m^2 \sigma_{\rho_m}^2.$$

11. The method according to claim 9, wherein the combination discrimination requirement depends on the bias of the combination and on a standard deviation of the combination.

12. The method according to claim 11, wherein the maximum combination discrimination requirement includes the maximization of $$D = \frac{\lambda}{2\sigma_n}$$

wherein the bias is taken into account by requesting the combination bias is smaller than a worst case combination bias $b_n$, which is obtained from the upper bounds $b_{\phi_m}$ and $b_{\rho_m}$ on the measurement biases by $$b_n = \sum_{m=1}^{M} |\alpha_m| \cdot b_{\phi_m} + |\beta_m| \cdot b_{\rho_m}.$$

13. The method according to Claim 11, wherein the maximum combination discrimination requirement includes the maximization of $$D = \frac{\lambda}{\kappa_1 \sigma_n + \kappa_2 b_n},$$

with the weighting coefficients $\kappa_1$ and $\kappa_2$ and the combination bias $$b_n = \sum_{m=1}^{M} \alpha_m b_{\phi_m} + \beta_m b_{\rho_m}.$$

14. A method for a global satellite navigation system with a plurality of carriers comprising the actions:

using the plurality of carriers by a reference station for estimating a satellite-satellite single difference phase and code bias, and providing the estimated bias to a mobile receiver, enabling the mobile receiver to use the bias for determining integer phase ambiguities, wherein individual biases are determined for the phase signal and the code signal of at least three carriers, and wherein at least two carriers belong to a common frequency band and have the same bias.

15. The method according to claim 14, wherein the individual biases of the L1 phase signal, the E5 phase signal, the L1 code signal and the E5 code signal are determined by dividing the Galileo E5 band into at least two subbands.

16. The method according to claim 15, wherein the Galileo E5 band is split into the subbands E5a, E5b and E5c, the latter one corresponding to the central lobe between E5a and E5b.

17. The method according to claim 14, wherein an orthogonal projection is used for the bias estimation to eliminate both ionospheric and tropospheric errors.

18. The method according to claim 14, wherein the reference station is transmitting the biases together with the standard deviations associated with the biases.

19. A method for a global satellite navigation system with a plurality of carriers comprising the actions of:

using the plurality of carriers by a reference station for estimating a satellite-satellite single difference phase and code bias, determining a satellite-satellite single difference bias of a single ionosphere-free, geometry-preserving combination of the code and phase signals of at least two carriers by using a maximum combination discrimination requirement or a minimum noise requirement for the linear combination, wherein an additional geometry-preserving, ionosphere-free code-carrier combination of time differences of measurements or time differences of geometry-preserving, ionosphere-free code-carrier combinations of measurements are used for determining the biases, and wherein the weighting coefficients of the additional combination fulfill the requirement that the additional combination and the other combination are uncorrelated, determining individual biases for the phase signal and the code signal of at least three carriers, wherein at least two carriers belong to a common frequency band and have the same bias, using the satellite-satellite single difference bias by the reference station for verifying the individual biases, and transmitting the individual biases are transmitted to a mobile receiver enabling the mobile receiver to use the biases for determining an integer phase ambiguity.

20. The method according to claim 19, wherein the satellite-satellite single difference bias is used if the individual biases are stated invalid.

* * * * *